(12) United States Patent
Endoh

(10) Patent No.: US 7,884,954 B2
(45) Date of Patent: Feb. 8, 2011

(54) PERIPHERAL EQUIPMENT AND MANAGEMENT METHOD THEREOF

(75) Inventor: Tomoaki Endoh, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1629 days.

(21) Appl. No.: 09/964,787

(22) Filed: Sep. 28, 2001

(65) Prior Publication Data

US 2002/0042880 A1   Apr. 11, 2002

(30) Foreign Application Priority Data

Oct. 2, 2000   (JP)   ................. 2000-302029

(51) Int. Cl.
*G06F 3/12* (2006.01)

(52) U.S. Cl. .................. 358/1.15; 358/1.1; 713/182; 380/55

(58) Field of Classification Search ................ 358/1.15, 358/1.1; 713/182; 380/55
See application file for complete search history.

(56) References Cited

U.S. PATENT DOCUMENTS

| | | | | |
|---|---|---|---|---|
| 5,509,074 A | * | 4/1996 | Choudhury et al. | 713/176 |
| 5,619,649 A | * | 4/1997 | Kovnat et al. | 358/1.15 |
| 5,720,036 A | * | 2/1998 | Garfinkle et al. | 709/225 |
| 5,819,047 A | * | 10/1998 | Bauer et al. | 709/229 |
| 5,897,260 A | * | 4/1999 | Zingher | 400/719 |
| 5,903,716 A | * | 5/1999 | Kimber et al. | 358/1.13 |
| 5,970,228 A | * | 10/1999 | Nezu | 726/34 |
| 5,987,228 A | * | 11/1999 | Nishizawa | 358/1.15 |
| 6,064,836 A | * | 5/2000 | Nakamura et al. | 399/8 |
| 6,151,464 A | * | 11/2000 | Nakamura et al. | 399/79 |
| 6,181,436 B1 | * | 1/2001 | Kurachi | 358/1.15 |
| 6,292,267 B1 | * | 9/2001 | Mori et al. | 358/1.15 |
| 6,349,304 B1 | * | 2/2002 | Boldt et al. | 707/102 |
| 6,378,070 B1 | * | 4/2002 | Chan et al. | 713/155 |
| 6,385,728 B1 | * | 5/2002 | DeBry | 726/9 |
| 6,587,217 B1 | * | 7/2003 | Lahey et al. | 358/1.15 |
| 6,667,816 B1 | * | 12/2003 | Van Buren et al. | 358/3.13 |
| 6,762,853 B1 | * | 7/2004 | Takagi et al. | 358/1.15 |

(Continued)

FOREIGN PATENT DOCUMENTS

EP   0 935 182   8/1999

(Continued)

OTHER PUBLICATIONS

Japanese Office Action dated Nov. 10, 2009, in related corresponding Japanese Patent Appln. No. 2001-299101 (with English translation).

(Continued)

*Primary Examiner*—David K Moore
*Assistant Examiner*—Benjamin O Dulaney
(74) *Attorney, Agent, or Firm*—Fitzpatrick, Cella, Harper & Scinto

(57) ABSTRACT

When managing a job inputted via a network or a console according to a job management command issued likewise via the network or the console, peripheral equipment managed by a directory server connected via the network decrypts an access ticket included in the job, decrypts the access ticket included in the job management command, and manages the job according to the decrypted contents of the access ticket included in the job and the access ticket included in the job management command.

12 Claims, 37 Drawing Sheets

U.S. PATENT DOCUMENTS

| | | | |
|---|---|---|---|
| 6,775,729 B1 | 8/2004 | Matsuo et al. | |
| 6,778,289 B1 * | 8/2004 | Iwata | 358/1.15 |
| 6,791,702 B2 * | 9/2004 | Tanaka | 358/1.13 |
| 6,859,832 B1 * | 2/2005 | Gecht et al. | 709/224 |
| 7,228,437 B2 * | 6/2007 | Spagna et al. | 713/193 |
| 7,248,693 B1 * | 7/2007 | Tretter et al. | 380/55 |
| 7,304,753 B1 * | 12/2007 | Richter et al. | 358/1.15 |

FOREIGN PATENT DOCUMENTS

| | | |
|---|---|---|
| EP | 1 026 578 | 8/2000 |
| JP | 2000010930 A | 1/2000 |
| JP | 2000163356 A | 6/2000 |
| JP | 2000222338 A | 8/2000 |

OTHER PUBLICATIONS

Atsushi Yoshida, Guide to Building Windows 2000 Active Directory Domain, First Edition, Softbank Publishing, Aug. 15, 1999, pp. 192-193 and 333-340 (with English translation of pp. 192 and 193).

* cited by examiner

FIG. 5

| ATTRIBUTE NAME | VALUE | READ/WRITE |
|---|---|---|
| SUPPORTED USER MANAGEMENT MODES | "NO USER MANAGEMENT", "PASSWORD", "USER ID", "USER ID & PASSWORD", "JOIN SECURITY DOMAIN" | READ ONLY |
| CURRENT USER MANAGEMENT MODE | "JOIN SECURITY DOMAIN" | READ/WRITE |
| ADAPTIVE DIRECTORY SERVER TYPES | "STANDARD LDAP SERVER", "ACTIVE DIRECTORY (MS)", "NDS (NOVELL)", "OPEN LDAP" | READ ONLY |
| CURRENT DIRECTORY SERVER TYPE | "ACTIVE DIRECTORY (MS)" | READ/WRITE |
| CURRENT DIRECTORY SERVER IP ADDRESS | 123.56.54.21 | READ/WRITE |
| CRYPTOGRAPH KEY | 0x34Q4BFFCDCA001 | WRITE ONLY |
| PERMISSION TO USE IN CASE OF INACCESSIBLE DIRECTOPY SERVER | TRUE | READ/WRITE |
| LIMIT TYPES FOR USE IN CASE OF INACCESSIBLE DIRECTORY SERVER | "NO LIMIT", "TIME", "TIME & FIXED MAX NO. OF PRINTS", "TIME & MAX NO. OF PRINTS", "FIXED MAX NO. OF PRINTS", "MAX NO. OF PRINTS", "FOR EACH LOGIN" | READ ONLY |
| CURRENT LIMIT TYPE FOR USE IN CASE OF INACCESSIBLE DIRECTORY SERVER | "TIME" | READ/WRITE |
| TIME LIMIT | 48 HOURS | READ/WRITE |
| DAILY REDUCTION RATIO OF MAX NO. OF PRINTS | 30 | READ/WRITE |
| MAX NO. OF PRINTS | 100 | READ/WRITE |
| MAX NO. OF PRINTS FOR EACH LOGIN | 20 | READ/WRITE |

FIG. 22

| USER NAME | PASSWORD | USER ID | PERMITTED NO. OF PRINTS | LOGIN TIME |
|---|---|---|---|---|
| ENDO | TOMOAKI | 1234 | 300 | 2000/06/05/ 10:23 |
| SHIMOTAI | NAOKO | 4532 | 1000 | 2000/06/04/ 13:52 |
| TAKAGI | TOMOKO | 2354 | 6000 | 2000/06/04/ 23:12 |

FIG. 35

| USER MANAGEMENT MODE | ~2301 |
| :---: | :---: |
| USER ID | ~2302 |
| PASSWORD | ~2303 |
| SESSION KEY | ~2304 |
| COMMAND TYPE | ~2305 |
| COMMAND PARAMETER LENGTH | ~2306 |
| COMMAND PARAMETER | ~2307 |

FIG. 36

| SESSION KEY (2401) | ACCESS TICKET AS DECIPHERED (USER ID ETC.) (2402) |
| :---: | :---: |
| 1234 | 2343, 2344 |
| 4235 | 5313, 5532 |

PERIPHERAL EQUIPMENT AND MANAGEMENT METHOD THEREOF

BACKGROUND OF THE INVENTION

1. Field of the Invention

The present invention relates to management of peripheral equipment such as a printer, a scanner, a copier and a facsimile.

2. Related Background Art

In the past, it was possible, in the peripheral equipment such as a printer, a copier, a facsimile (FAX) and a scanner, to perform management of jobs (displaying a job list, canceling a specified job and so on) of which operation or execution is pending in the equipment from a computer connected to the equipment via a console of the equipment or a network and so on.

In addition, in the past, the peripheral equipment such as the copier and the facsimile performed user authentication, in order to perform user information management, by displaying a dialog for performing user authentication on the console and having user information inputted thereon. The user information obtained here was checked against a database of the user information managed inside the equipment so that use permission of the user was issued in the case where they coincided. Moreover, in the case where some printing was performed as a result of user operation, the number of prints was logged together with the user information obtained on a login or accumulated on a counter for each user so as to manage the number of prints for each user.

In addition, in the past, the peripheral equipment such as the printer and the copier performed, by discrete devices, management of the numbers of prints such as management of the accumulated number of prints for each user and limitation by the maximum number of prints. In this case, it was performed by providing in the equipment a counter for representing the accumulated printing, and ending printing or refusing to accept a job when this value becomes a predetermined value.

SUMMARY OF THE INVENTION

Therefore, an object of the present invention is, in terms of job management in a network environment, to provide peripheral equipment, an information processing apparatus, a peripheral equipment control system, a management method, management software and storage media that allows a unified access control. Another object of the present invention is, in terms of job management in a network environment, to provide the peripheral equipment and the management method thereof capable of performing the unified access control without deteriorating performance.

To attain the above objects, when managing the job inputted via the network or the console according to a job management command issued likewise via the network or the console, the peripheral equipment of the present invention managed by a directory server connected via the network decrypts an access ticket included in the job, decrypts the access ticket included in the job management command, and manages the job according to the decrypted contents of the access ticket included in the job and the access ticket included in the job management command.

Other objects and characteristics of the present invention will be clear from the following description and drawings.

BRIEF DESCRIPTION OF THE DRAWINGS

FIG. 5 is a diagram showing attribute information held by the MFP(1);

FIG. 22 is a diagram showing the data structure of a user information cache;

FIG. 35 is a diagram showing the data structure of the management command generated by a management command generation process mentioned later and sent to the MFP(1);

FIG. 36 is a diagram showing the data structure of an access ticket cache held in a RAM 22 of the MFP(1) by the process of an access ticket setting command mentioned later;

DESCRIPTION OF THE PREFERRED EMBODIMENT

Figure 1:
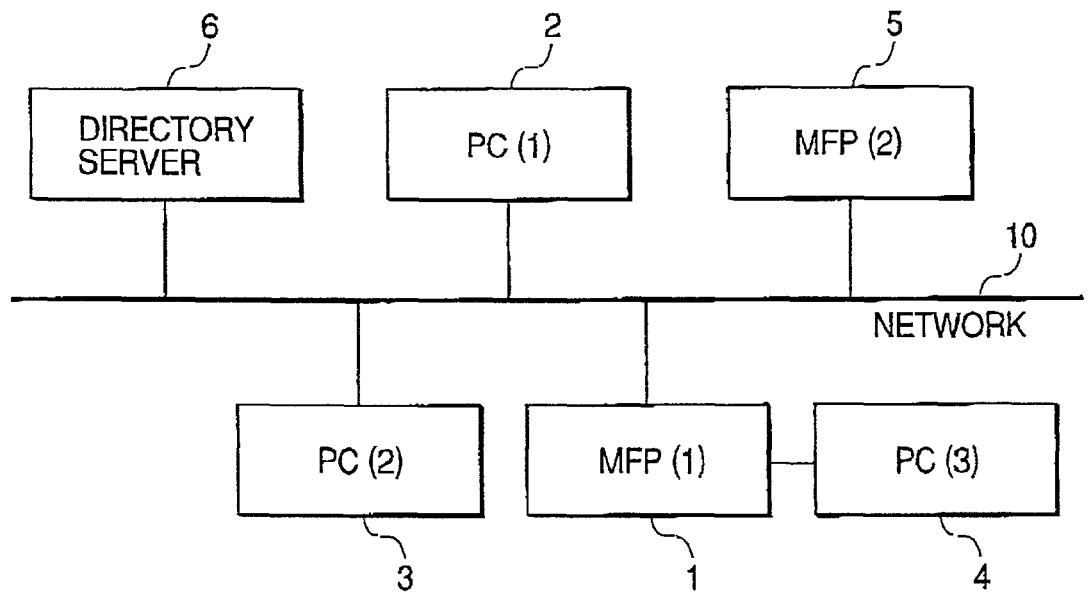
FIG. 1 is a block diagram showing a configuration of a peripheral equipment control system according to a first embodiment.

Embodiments of the present invention will be described hereafter by referring to the drawings.

In the embodiments, peripheral equipment is a multi function printer, which is abbreviated as MFP in the following description.

First Embodiment

FIG. 1 is a block diagram showing a configuration of a peripheral equipment control system according to a first embodiment in the drawing, reference numerals 1 and 5 denote an MFP(1) and an MFP(2), respectively (hereafter uniformly referred to as the MFP(1) 1 and the MFP(2) 5). In addition, reference numerals 2, 3 and 4 denote personal computers described as a PC(1), a PC(2) and a PC(3), respectively (hereafter uniformly referred to as the PC(1) 2, the PC(2) 3 and the PC(3) 4). The PC(1) 2, the PC(2) 3 and the PC(3) 4 are connected to the MFP(1) 1 and the MFP(2) 5 by way of a network 10 or a local interface respectively. On the PC(1) 2, the PC(2) 3 and the PC(3) 4, peripheral equipment control software related to the present invention operates and requests the MFP(1) 1 to process the jobs such as a print, a scan, a copy or a fax transmission and reception or inquire about attribute information of the MFP(1) 1 and the MFP(2) 5.

In addition, reference numeral 6 denotes a directory server having a centralized management function of user information and device information on the network 10, and is comprised of a general purpose computer and so on. This director server 6 also has a KDS (Key Distribution Server) function in a Kerberos protocol (RFC1510) and issues a TGT (Ticket Generation Ticket) ticket and an access ticket required for accessing a specified resource in compliance with regulations of the Kerberos protocol.

Moreover, this directory server 6 is supposed to have an MFP(1) 1 and an MFP(2) 5 already registered. This data can be referred to and updated from a PC(1) 2 and a PC(2) 3 by using an LDAP protocol (RFC1777). Each piece of the user information managed in the directory server 6 includes a user name, a password, the permitted number of prints of the user and the accumulated number of prints of the user. In addition, each piece of the device information managed in the directory server 6 includes a device name and a cryptograph key.

Figure 2:
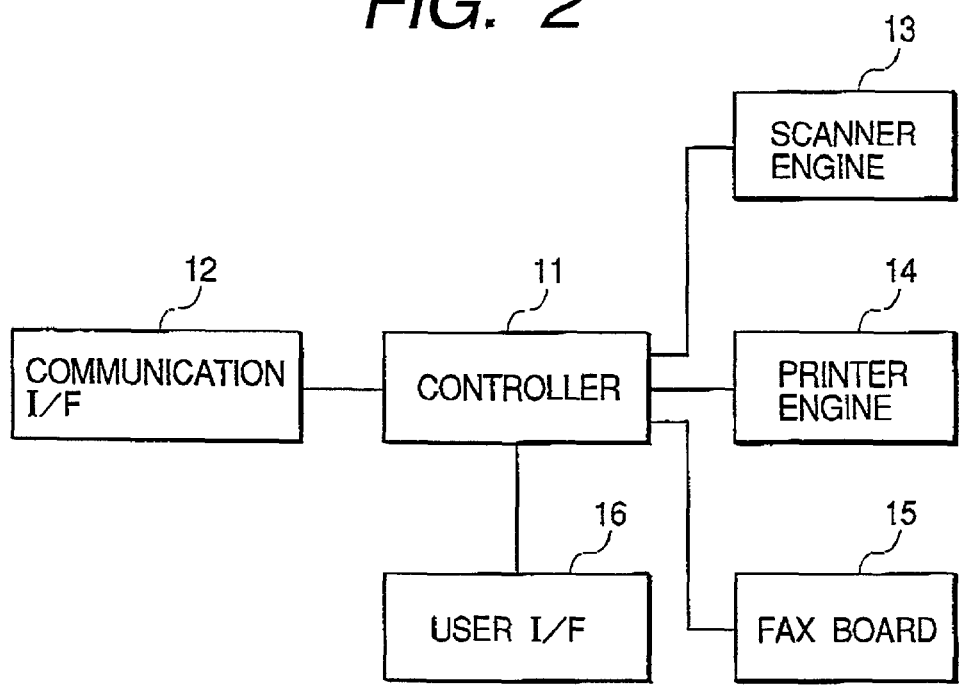
FIG. 2 is a block diagram showing a configuration of an MFP(1) and an MFP(2)

The users using the PC(1) 2, the PC(2) 3 and the PC(3) 4 are registered with and managed by the directory server 6 as network users, and may use network resources such as various application servers (not shown) on the network 10 and the peripheral equipment including the MFP(1) 1, the MFP(2) 5 and so on managed by the directory server 6 FIG. 2 is a block diagram showing a configuration of the peripheral equipment (the MFP(1) 1 and the MFP(2) 5). In the diagram, reference numeral 11 denotes a controller for controlling the peripheral equipment. Reference numeral 12 denotes a communication interface for the controller 11 to communicate with the outside of the peripheral equipment, which is an Ethernet interface, an IEEE1284 interface or another communication interface for instance.

Reference numeral 13 denotes a scanner engine and is controlled by the controller 11. Reference numeral 14 denotes a printer engine and is controlled by the controller 11, and for instance, it is a laser beam printer, an ink jet printer or another printer.

Reference numeral 15 denotes a FAX board for implementing a FAX function of performing communication control such as sending and receiving images, and is controlled by the controller 11. Reference numeral 16 denotes a user interface comprised of an LCD display and a keyboard, and displays information from the controller 11 and communicates an instruction from the user to the controller 11.

The peripheral equipment having such a configuration selects a printer engine 14 and allows a print job to be issued. In addition, it selects the printer engine 14 and a scanner engine 13 to allow a copy job to be issued. Moreover, it selects the printer engine 14, the scanner engine 13 and the FAX board 15 to allow a FAX reception job and a FAX transmission job to be issued.

Figure 3:
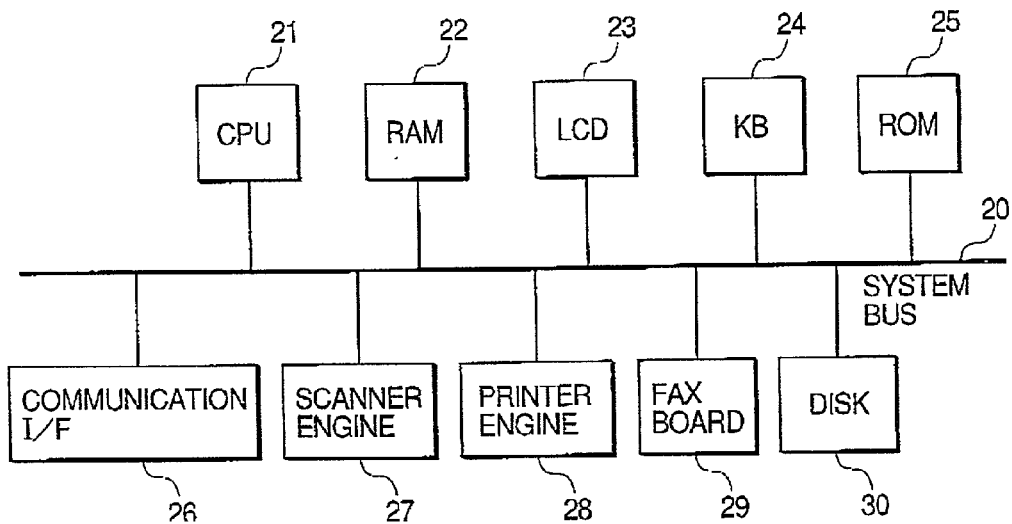
FIG. 3 is a block diagram showing a hardware configuration of a controller 11.

FIG. 3 is a block diagram showing a hardware configuration of the controller 11. The controller 11 is mutually connected via a system bus 20 with a CPU 21, a RAM 22, an LCD 23, a keyboard 24, a ROM 25, a communication Interface 26, a scanner engine 27, a printer engine 28, a FAX board 29 and a disk 30.

A program for controlling the controller 11 is stored in the ROM 25 or the disk 30, and is read by the RAM 22 as required and executed by the CPU 21. Also, the ROM 25 or the disk 30 has attribute information showing the peripheral equipment and functions and states of the jobs to be processed by the peripheral equipment and job data to be outputted and so on stored in addition to the control program. Moreover, the CPU 21 produces a display on the LCD 23 and is instructed by the user from the keyboard 24. In addition, the CPU 21 performs communication with the outside through the interface 26.

In the peripheral equipment (FIG. 2) according to this embodiment, unless specifically noted otherwise, the CPU 21 receives the user-input from the keyboard 24 via the system bus 20 and controls the RAM 22, the LCD 23, the ROM 25, the communication interface 26, the scanner engine 27, the printer engine 28, the FAX board 29 and the disk 30.

Figure 4:
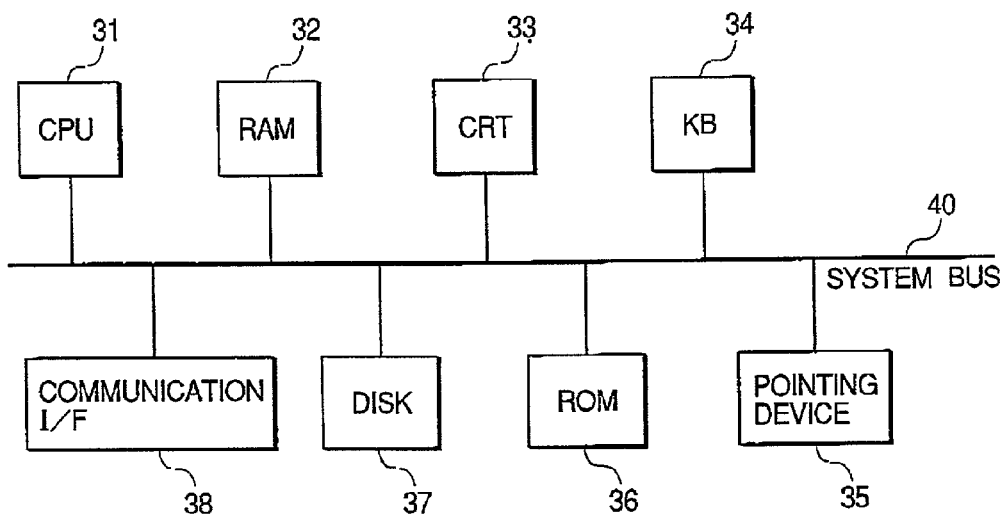
FIG. 4 is a block diagram showing the hardware configuration of a PC constituting a network system.

FIG. 4 is a block diagram showing the hardware configuration of the PC constituting a network system. On the PC, a CPU 31, a RAM 32, a CRT 33, a keyboard 34, a pointing device 35, a ROM 36, a disk 37 and a communication interface 38 are mutually connected via a system bus 40. The program for controlling the PC is stored in the ROM 36 or the disk 37, and is read by the RAM 32 as required and executed by the CPU 31. Moreover, the CPU 31 produces a display through the CRT 33 and is instructed by the user from the keyboard 34 and the pointing device 35. In addition, the CPU 31 performs communication with the outside through the communication interface 38.

In the PC according to this embodiment, unless specifically noted otherwise, the CPU 31 receives the user-input from the keyboard 34 or the pointing device 35 via the system bus 40 and controls the RAM 32, the CRT 33, the ROM 36, the disk 37 and the communication interface 38. In addition, the user's instruction to the MFPs and display of information to the user may be performed either through a local user interface 16 or through the device to be a client connected to the network 10 such as the PC(1) 2, the PC(2) 3 and the PC(3) 4.

FIG. 5 is a diagram showing the attribute information held by the MFP(1) 1. While the MFP(2) 5 has the same data structure as the MFP(1) 1, values held thereby are different. Such information is held by the ROM 25, the RAM 22 and the disk 30, and the individual attribute information may be obtained or set from the PC(1) 2, the PC(2) 3 and the PC(3) 4 by the process mentioned later.

In the diagram, 301 is a "Supported User Management Mode List" attribute, and holds a plurality of values as a list, that is, "No User Management," "Password," "User ID," "User ID and Password" and "Join Security Domain."

Reference numeral 302 denotes a "Current User Management Model" attribute, and holds "Join Security Domain" as the value. Reference numeral 303 denotes an "Adaptive Directory Server Type List" attribute, and holds a plurality of values as the list, that is, "Standard LDAP Server," "Active Directory (MS)," "NDS (Novell)" and "Open LDAP."

Reference numeral 304 denotes a "Current Directory Server Type" attribute, and holds "Active Directory (MS)" as the value. Reference numeral 305 denotes a "Current Directory Server IP Address" attribute, and holds "123. 56. 54. 21" as the value. Reference numeral 306 denotes a "Cryptograph key" attribute, and holds "0x34q4bffcdca001" as the value. This value becomes effective in the case where the "Current User Management Mode" attribute is "Join Security Domain," and is used to interpret the access ticket issued from the directory server 6.

Reference numeral 307 denotes a "Permission to Use in case of Inaccessible Directory Server" attribute, and holds "TRUE" as the value. Reference numeral 308 denotes a "Limit Types for Use in case of Inaccessible Directory Server" attribute, and holds a plurality of values as the list, that is, "No Limit," "Time," "Time and Fixed Max No. of Prints," "Time and Max No. of Prints," "Fixed Max No. of Prints," "Max No. of Prints" and "For each Login."

Reference numeral 309 denotes a "Current Limit Types for Use in case of Inaccessible Directory Server" attribute, and holds "Time" as the value. Reference numeral 310 denotes a "Time Limit" attribute, and holds "48 Hours" as the value. Reference numeral 311 denotes a "Daily Reduction Ratio of Max No. of Prints" attribute, and holds "30" as the value. Reference numeral 312 denotes a "Max No. of Prints" attribute, and holds "100" as the value. Reference numeral 313 denotes a "Max No. of Prints for each Login" attribute, and holds "20" as the value.

Figure 6:
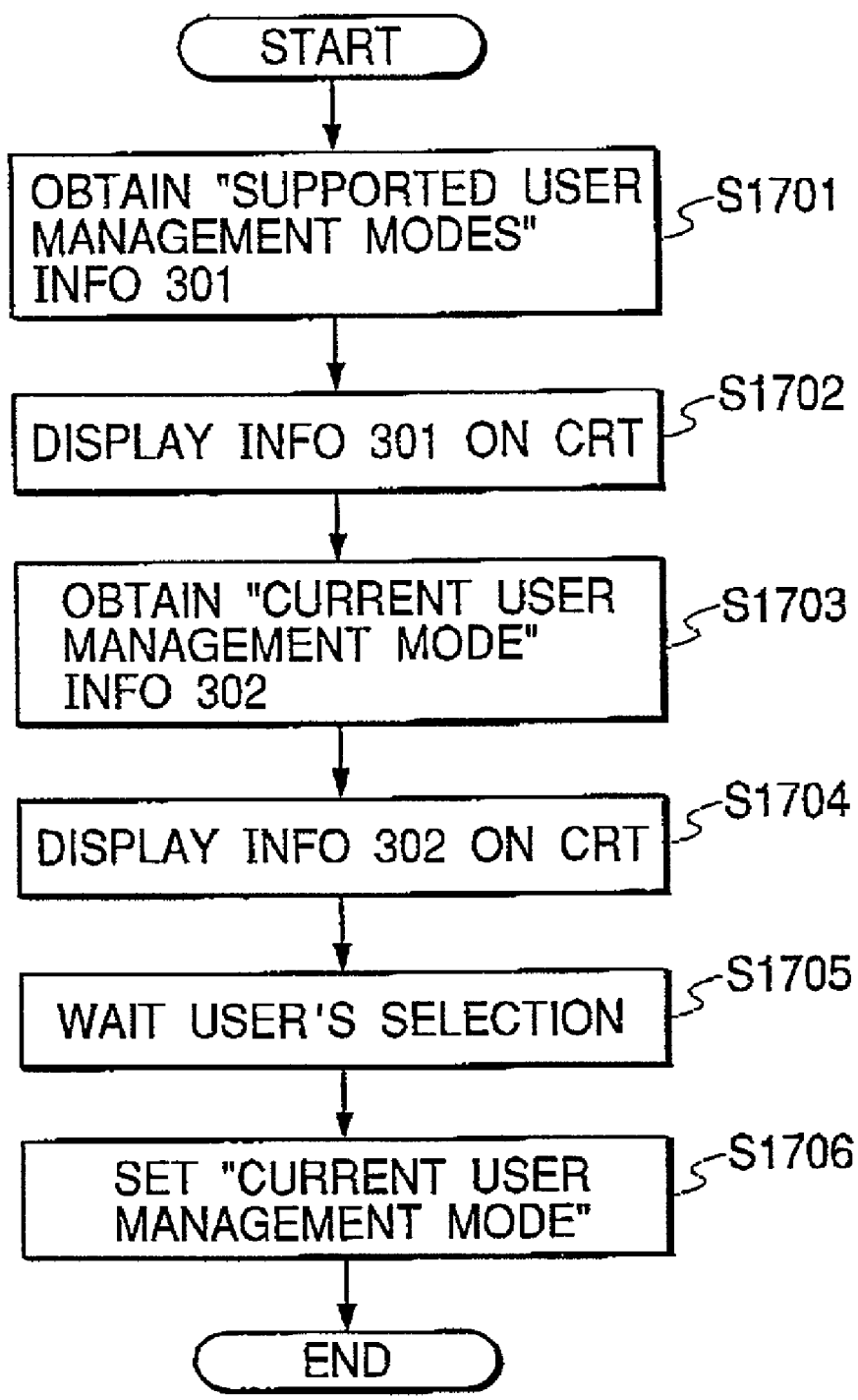
FIG. 6 is a flowchart showing a procedure for displaying and/or changing a user management mode of the MFP(1) from a PC(1), a PC(2) and a PC(3)

FIG. 6 is a flowchart showing the procedure for displaying and/or changing a user management mode of the MFP(1) 1 from the PC(1) 2, the PC(2) 3 and the PC(3) 4. This processing program runs on the PC(1) 2, the PC(2) 3 and the PC(3) 4. First, it obtains attribute information 301 of the MFP(1) 1 (step S1701). This attribute information is obtained by sending an attribute acquisition command from the PC(1) 2, the PC(2) 3 and the PC(3) 4 to the MFP(1) 1 and processing this command on the MFP(1) 1. And it displays the obtained attribute information on the CRT 33 (step S1702). Furthermore, it obtains a "Current User Management Mode" attribute 302 that is the attribute information (step S1703) and displays it on the CRT 33 (step S1704).

It waits for the user-input (step S1705), and sets the "Current User Management Mode" attribute 302 that is the attribute information (step S1706) according to the user-input to finish the process. This attribute information is set by sending an attribute setting command from the PC(1) 2, the PC(2) 3 and the PC(3) 4 to the MFP(1) 1 and processing this command on the MFP(1) 1.

Figure 7:
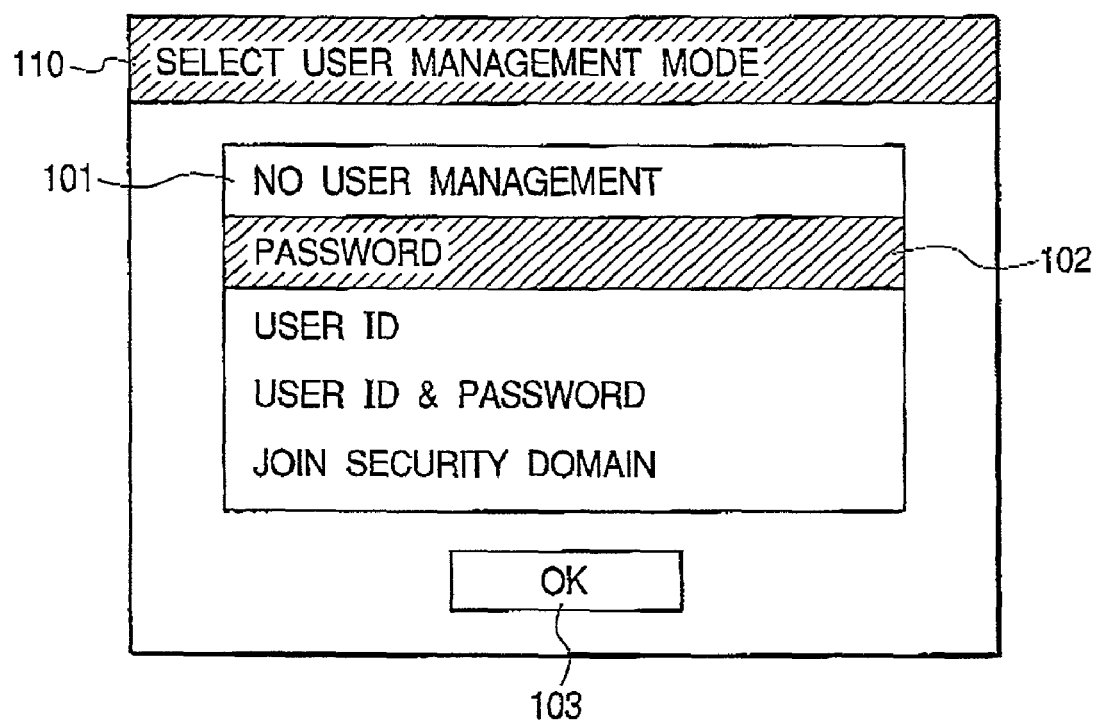
FIG. 7 is a diagram showing a user interface screen displayed on a CRT 33 in a state of waiting for user-input in a step S1705.

FIG. 7 is a diagram showing a user interface screen displayed on the CRT 33 in the state of waiting for user-input in a step S1705. In the diagram, 101 indicates a list of the user management modes (attribute 301) that can be selected by the user. The attribute 302 of the currently set user management mode is in reverse video in 102 in the diagram. The user selects a desired user management mode and puts it in reverse video, and presses an OK button 103 to execute the process of the step S1706 and perform setting of the user management mode.

Moreover, the procedure in FIG. 6 may be performed by, instead of the PCs, the controller 11 of the MFP(1) 1 itself of which user management mode is to be changed, and the display in FIG. 7 may also be performed on the user interface 16 included in the MFP. It may also be performed and/or displayed on the other MFP(2) 5.

Figure 8:
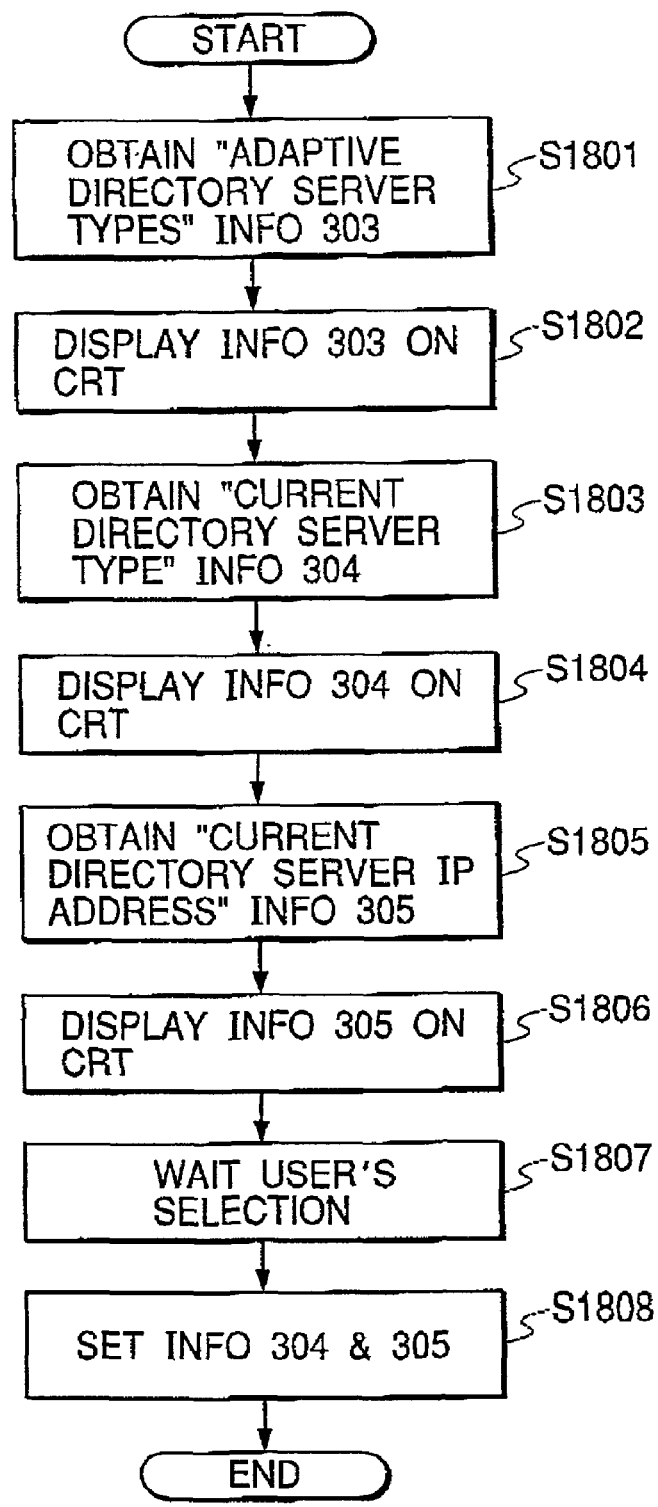
FIG. 8 is a flowchart showing an operating procedure for displaying and/or changing a directory server corresponding to the MFP(1) from the PC(1), the PC(2) and the PC(3)

FIG. 8 is a flowchart showing an operating procedure for displaying and/or changing a directory server corresponding to the MFP(1) 1 from the PC(1) 2, the PC(2) 3 and the PC(3) 4. This procedure is performed on the PC(1) 2, the PC(2) 3 and the PC(3) 4.

First, attribute information 303 is obtained (step S1801). This attribute information is obtained by sending the attribute acquisition command from the PC(1) 2, the PC(2) 3 and the PC(3) 4 to the MFP(1) 1 and processing this command on the MFP(1) 1 following the procedure mentioned later. And the obtained attribute information is displayed on the CRT 33 (step S1802).

Furthermore, attribute information 304 is obtained (step S1803) and the obtained attribute information is displayed on the CRT 33 (step S1804). Attribute information 305 is obtained (step S1805) and the obtained attribute information 305 is displayed on the CRT 33 (step S1806).

The user-input is waited for (step S1807), and attribute information 304 and 305 is set according to the user-input (step S1808). This attribute information is set by sending an attribute setting command from the PC(1) 2, the PC(2) 3 and the PC(3) 4 to the MFP(1) 1 and processing this command on the MFP(1) 1 following the procedure mentioned later.

Figure 9:
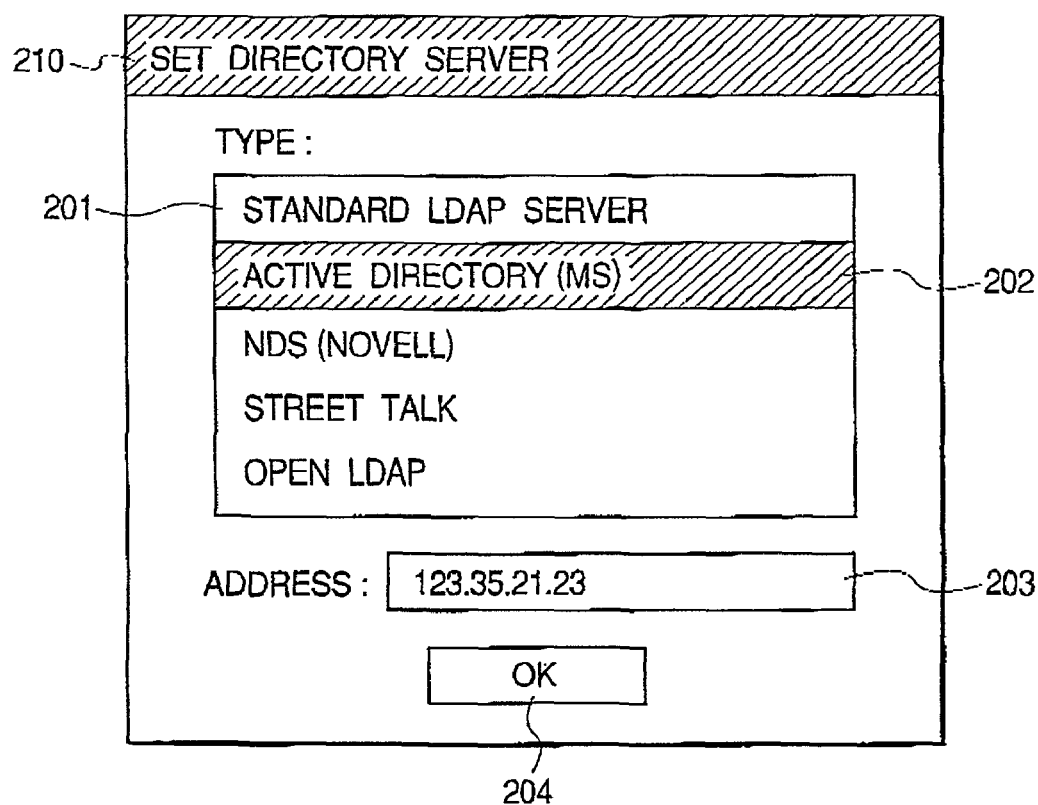
FIG. 9 is a diagram showing user interface screen displayed on a CRT 33 in a state of waiting for user-input in a step S1807.

FIG. 9 is a diagram showing the user interface screen displayed on the CRT 33 in the state of waiting for user-input in a step S1807. In the diagram, 201 indicates the list of the directory server types (attribute 303) that can be selected by the user. The currently set directory server type (attribute 304) is in reverse video in 202 in the diagram. Moreover, an IP address 305 of the currently set directory server is displayed in an address division 203. The user selects a desired directory server type and puts it in reverse video, inputs a desired IP address in the address division 203, and presses an OK button 204 to execute the process of the step S1808 and perform setting of the corresponding directory server.

Moreover, the process shown in FIG. 8 may be performed by, instead of the PCs, the controller 11 of the MFP(1) 1 itself of which set directory server is to be changed, and the display shown in FIG. 9 may also be performed by the user interface 16 included in the MFP. It may also be performed and/or displayed on the other MFP(2) 5.

Figure 10:
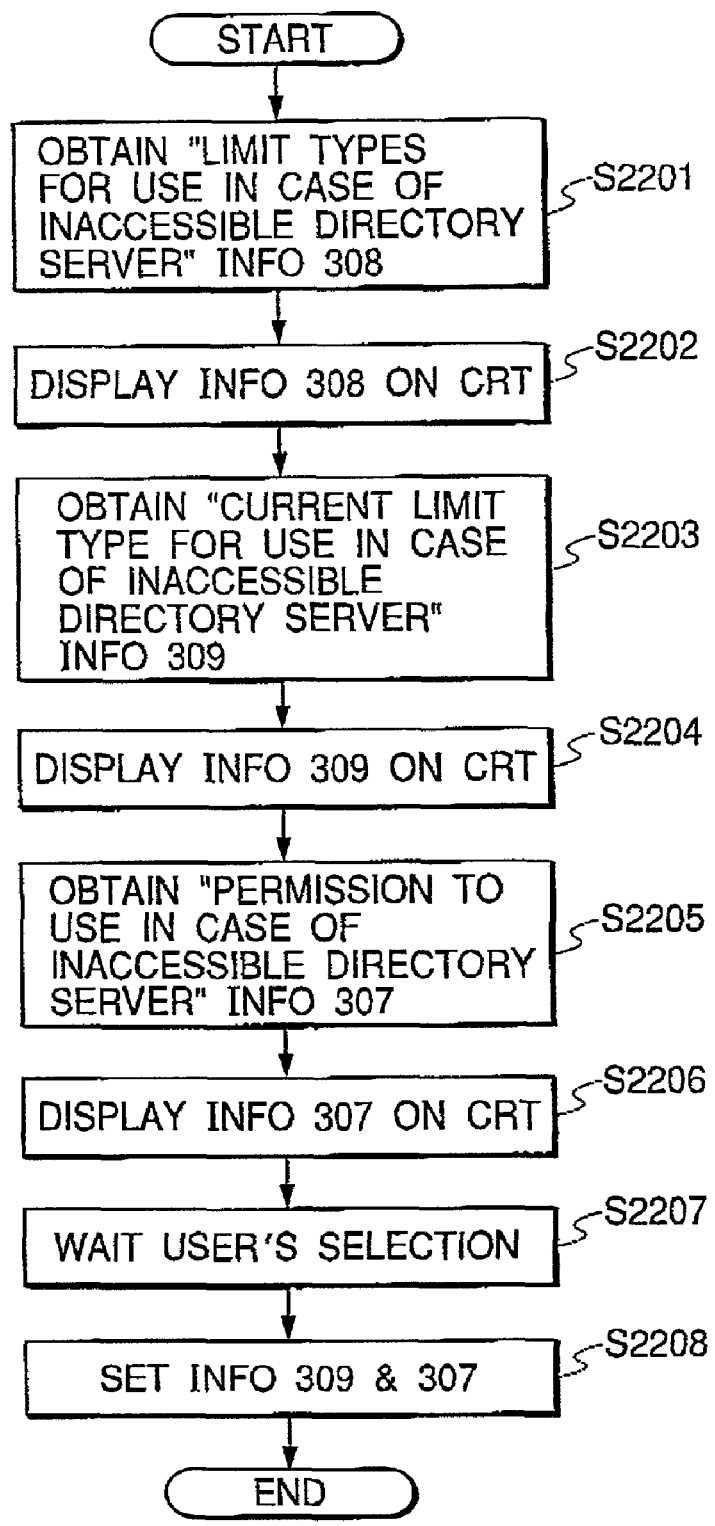
FIG. 10 is a flowchart showing the procedure for displaying and/or changing how to permit a login from the PC(1), the PC(2) and the PC(3) in the case where the MFP(1) cannot be connected to a directory server 6.

FIG. 10 is a flowchart showing the procedure for displaying and/or changing from the PC(1) 2, the PC(2) 3 and the PC(3) 4 how to permit a login in the case where the MFP(1) cannot be connected to the directory server 6. This procedure is performed on the PC(1) 2, the PC(2) 3 and the PC(3) 4.

First, a "Limit Types for Use in case of Inaccessible Directory Server" attribute 308 that is the attribute information is obtained (step S2201). The attribute information is obtained by sending the attribute acquisition command from the PC(1) 2, the PC(2) 3 and the PC(3) 4 to the MFP(1) 1 and processing this command on the MFP(1) 1 following the procedure mentioned later. And the obtained attribute information is displayed on the CRT 33 (step S2202).

A "Current Limit Type for Use in case of Inaccessible Directory Server" attribute 309 that is the attribute information is obtained (step S2203) and the obtained attribute information is displayed on the CRT 33 (step S2204). Furthermore, a "Permission to Use in case of Inaccessible Directory Server" attribute 307 that is the attribute information is obtained (step S2205). The obtained attribute information is displayed on the CRT 33 (step S2206).

The user-input is waited for (step S2207), and attribute information 309 and 307 is set according to the user-input (step S2208) to finish the process. The attribute information is set by sending the attribute setting command from the PC(1) 2, the PC(2) 3 and the PC(3) 4 to the MFP(1) 1 and processing this command on the MFP(1) 1 following the procedure mentioned later.

Figure 11:
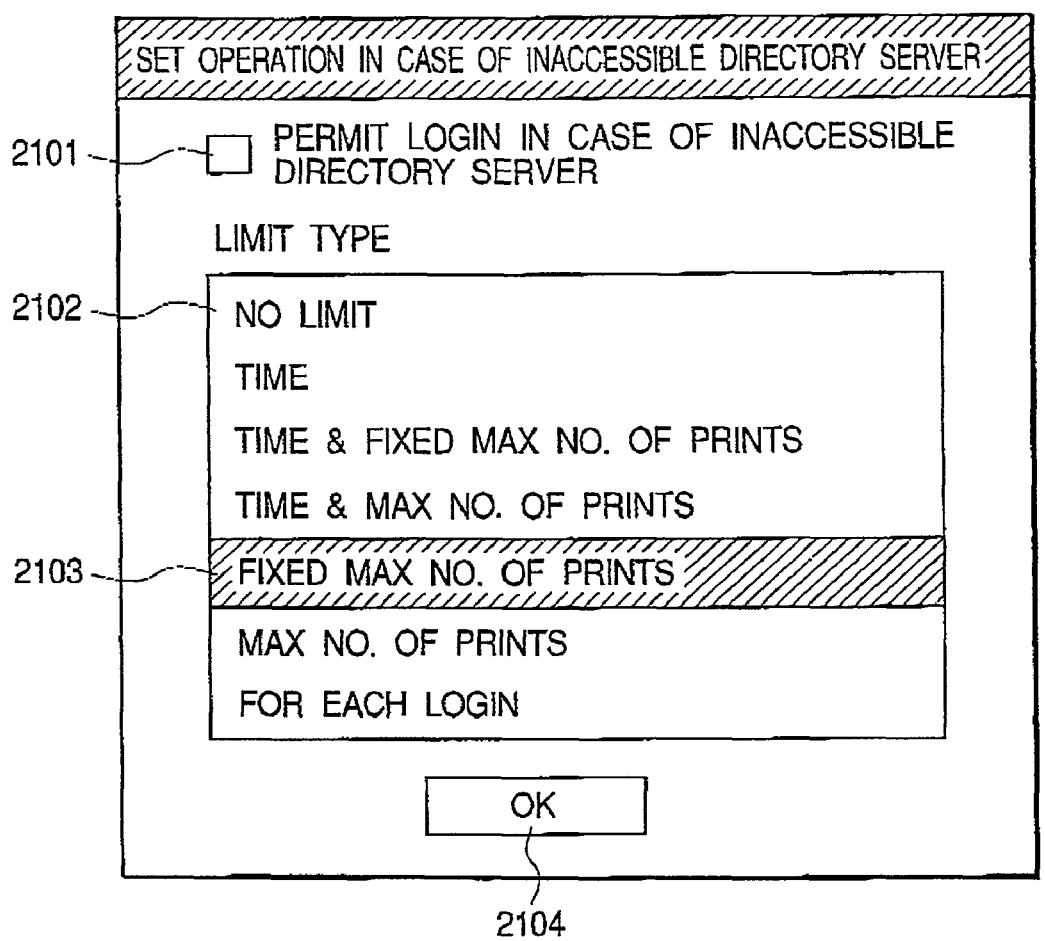
FIG. 11 is a diagram showing a user interface screen displayed on a CRT 33 in a state of waiting for user-input in a step S2207.

FIG. 11 is a diagram showing the user interface screen displayed on the CRT 33 in the state of waiting for the user-input in a step S2207. In the diagram, 2102 indicates the contents of the "Limit Types for Use in case of Inaccessible Directory Server" attribute 308, and the value of the "Current Limit Type for Use in case of Inaccessible Directory Server" attribute 309 is in reverse video in 2103 in the diagram. Moreover, the value of the "Permission to Use in case of Inaccessible Directory Server" attribute 307 is displayed in a check box 2101. The user performs a desired setting and then presses an OK button 2104 to execute the process of the step S2208 and perform setting of the attribute information.

Moreover, the process shown in FIG. 10 may be performed by, instead of the PCs, the controller 11 of the MFP(1) 1 itself of which setting is to be changed, and the display shown in FIG. 11 may also be performed by the user interface 16 included in the MFP. Furthermore, it may be performed and/or displayed on the other MFP(2) 5.

Figure 12:
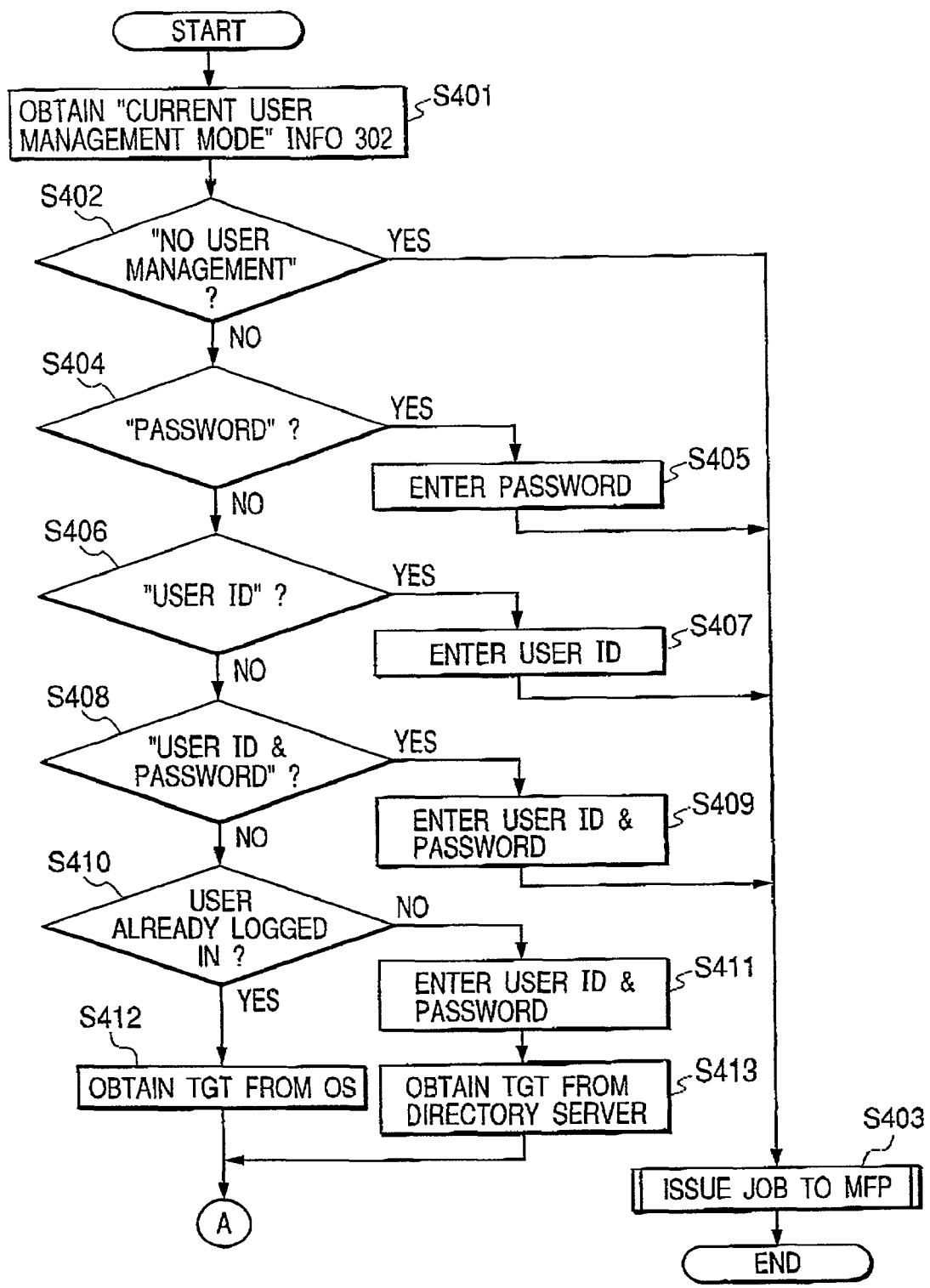
FIG. 12 is a flowchart showing the procedure for issuing a print jobs a scanner job, a fax transmission job and a copy job from the PC(1), the PC(2) and the PC(3) to the MFP(1)
Figure 13:
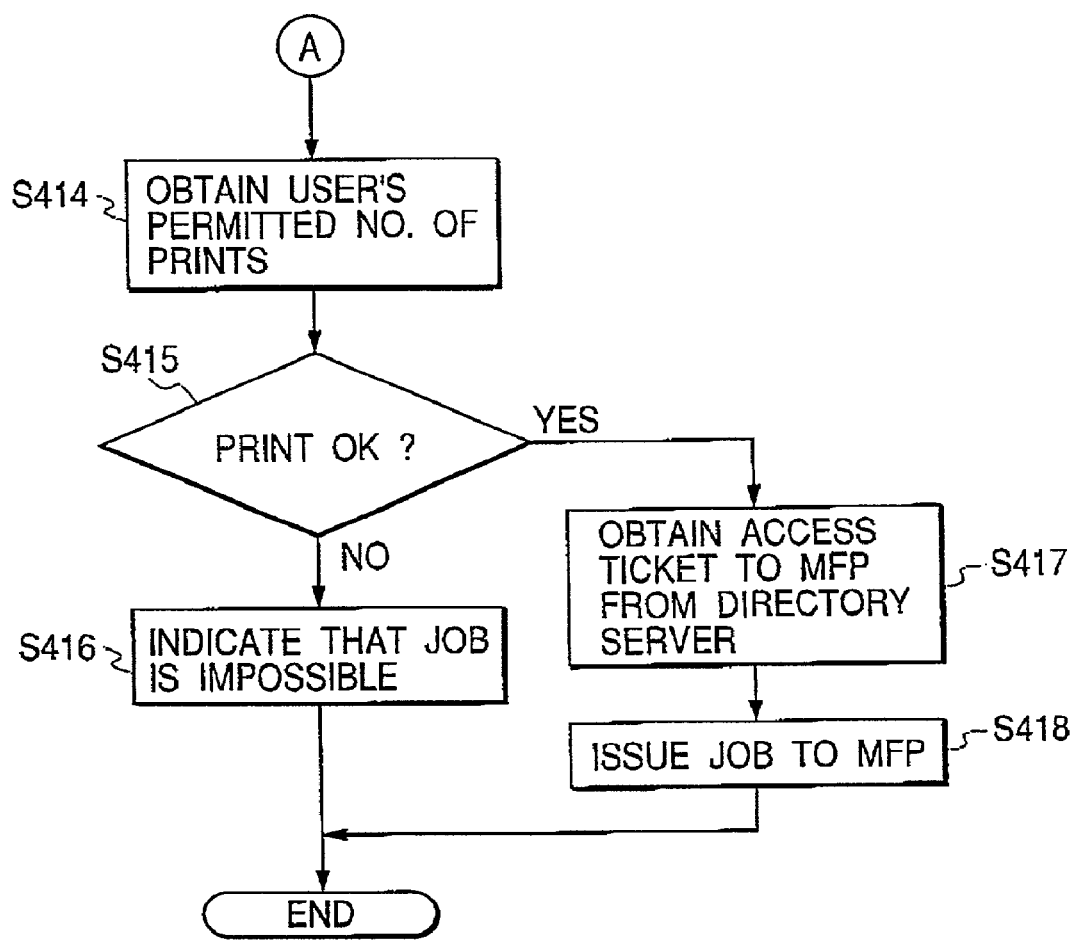
FIG. 13 is a flowchart following FIG. 12 for showing the procedure for issuing a print job, a scanner job, a fax transmission job and a copy job from the PC(1), the PC(2) and the PC(3) to the MFP(1)

FIGS. 12 and 13 are flowcharts showing the procedure for issuing a print job, a scanner job, a fax transmission job or a copy job from the PC(1) 2, the PC(2) 3 and the PC(3) 4 to the MFP(1) 1. This procedure is performed on the PC(1) 2, the PC(2) 3 and the PC(3) 4.

First, the "Current User Management Mode" attribute 302 that is the attribute information held by the MFP(1) 1 is obtained (step S401). It is determined whether or not the value of the attribute information 302 is "No User Management" (step S402). In the case where it is "No User Management" as a result of the determination, other information required for the job is set on the job, and then the job is issued to the MFP(1) 1 (step S403). Then the process is finished.

On the other hand, in the case where it is "User Management" in the step S402, it is determined whether or not the value of the attribute information 302 is "Password" (step S404). In the case where it is "Password" as a result of the determination, the user interface screen prompting for the password is displayed on the CRT 33 (step S405) And in the step S403, other information required for the inputted password and the job is set on the job, and then the job is issued to the MFP(1) 1.

On the other hand, in the case where it is not "Password" as a result of the determination in the step S404, it is determined whether or not the value of the attribute information 302 is "User ID" (step S406). In the case where it is "User ID" as a result of the determination, the user interface screen prompting for the user ID is displayed on the CRT 33 (step S407). And in the step S403, other information required for the inputted user ID and the job is set on the job, and then the job is issued to the MFP(1) 1.

On the other hand, in the case where it is not "User ID" as a result of the determination in the step S406, it is determined whether or not the value of the attribute information 302 is "User ID and Password" (step S408). In the case where it is "User ID and Password" as a result of the determination, the user interface screen prompting for the user ID and password is displayed on the CRT 33 (step S409). And in the step S403, other information required for the inputted user ID, password and the job is set on the job, and then the job is issued to the MFP(1) 1.

On the other hand, in the case where it is not "User ID and Password" as a result of the determination in the step S408, it is determined whether or not the user has already logged in to a security domain managed by the directory server 6 on the PC being used (step S410). This determination is made by inquiring of an operating system of the PC being used. In the case where the user has not logged in as a result of the determination, the user interface screen prompting for the user ID and password is displayed on the CRT 33 (step S411), and the information is sent to the directory server 6 by using the Kerberos protocol so as to obtain TGT (Ticket Generation Ticket) information (step S413).

On the other hand, in the case where the user has already logged in as a result of the determination in the step S410, the TGT used in a current session is requested of the operating system and is obtained (step S412).

The TGT obtained in the step S412 or S413 is used to obtain the permitted number of prints information of the user falling under the user name held by the operating system or the user name inputted in the step S411 from the directory server 6 by the Kerberos protocol and the LDAP protocol (step S414).

It is determined thereafter whether or not the permitted number of prints is one or more (step S415), and in the case where it cannot be printed since it is less than one as a result of the determination, the user interface screen representing that the job cannot be issued is displayed on the CRT 33 (step S416) to finish the process.

On the other hand, in the case where printing is possible with the permitted number of prints of one or more as a result of the determination in the step S415, the TGT obtained in the step S412 or S413 and a parameter of an identifier identifying the MFP(1) 1 of the job issue destination are sent to the directory server 6 by the Kerberos protocol to obtain the access ticket for the MFP(1) 1 (step S417). The access ticket obtained here has the information on the user name, the user ID, the user's permitted number of prints and its expiration date that is encrypted by cryptograph key attribute information 306 of the MFP(1) 1. A data format in the access ticket and encryption (algorithm) to be used are uniquely determined in advance according to the currently corresponding directory server type (attribute information 304).

And the access ticket obtained in the step S417 and the other information required for the job are set on the job, and then the job is issued to the MFP(1) 1 (step S418) to finish the process.

Figure 14:
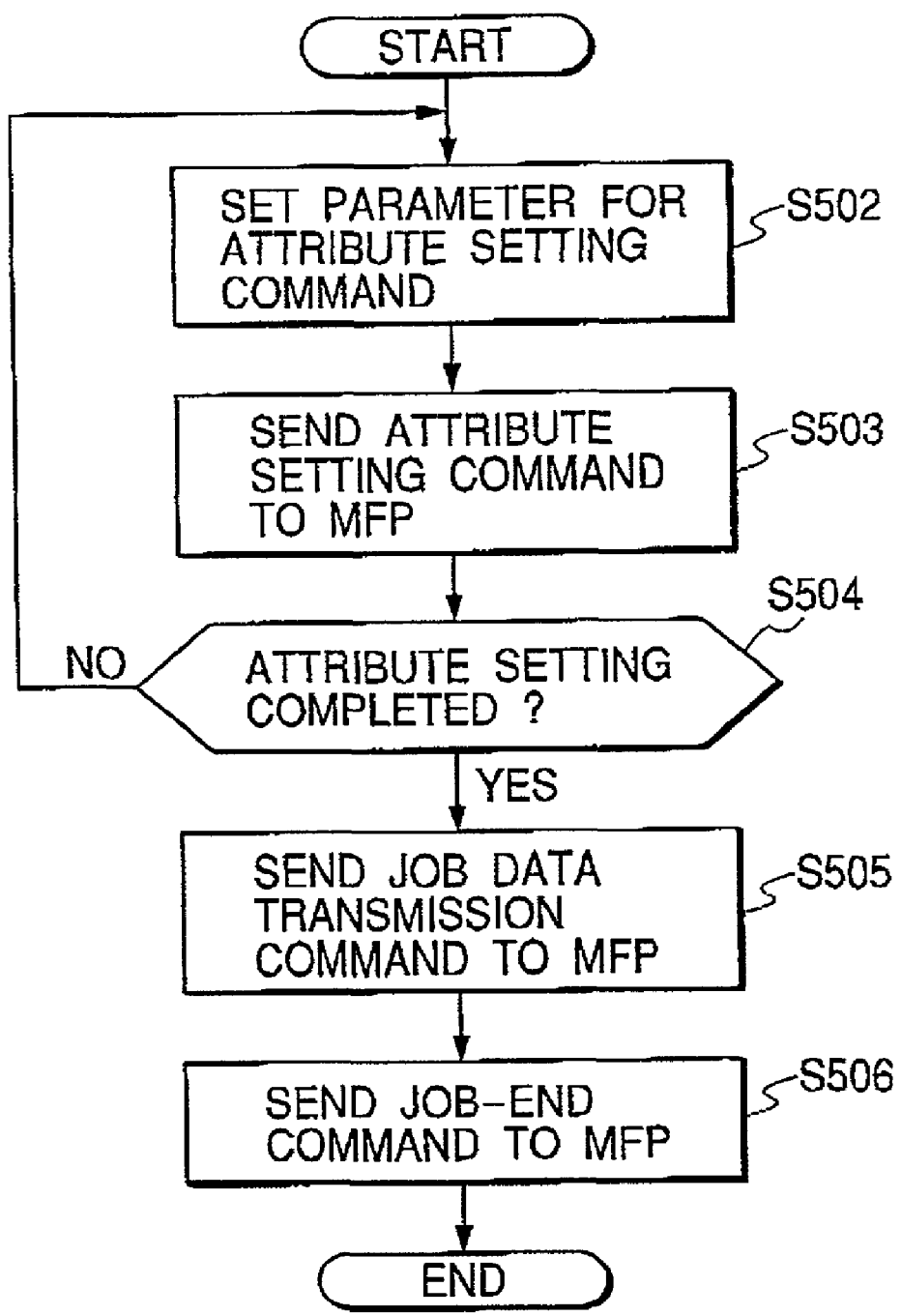
FIG. 14 is a flowchart showing the procedure for issuing a job in a step S403.

FIG. 14 is a flowchart showing the procedure for issuing the job in the step S403. First, the parameter of the attribute setting command for the attribute required for the job is set (step S502). This parameter is comprised of an attribute name of a setting subject and the value therefor. The attribute setting command created in the step S502 is sent to the MFP(1) 1 (step S503). It is determined whether or not the setting of the required job attribute is completed (step S504), and in the case where it is not completed, the process in the step S502 is repeated.

On the other hand, in the case where the setting of the required job attribute is completed in the step S504, target data of job processing such as image data created by an application and so on is sent to this MFP by a job data transmission command (step S505). A job submitting completion notice command showing completion of sending the job submitting command is sent (step S506) to finish the process.

Figure 15:
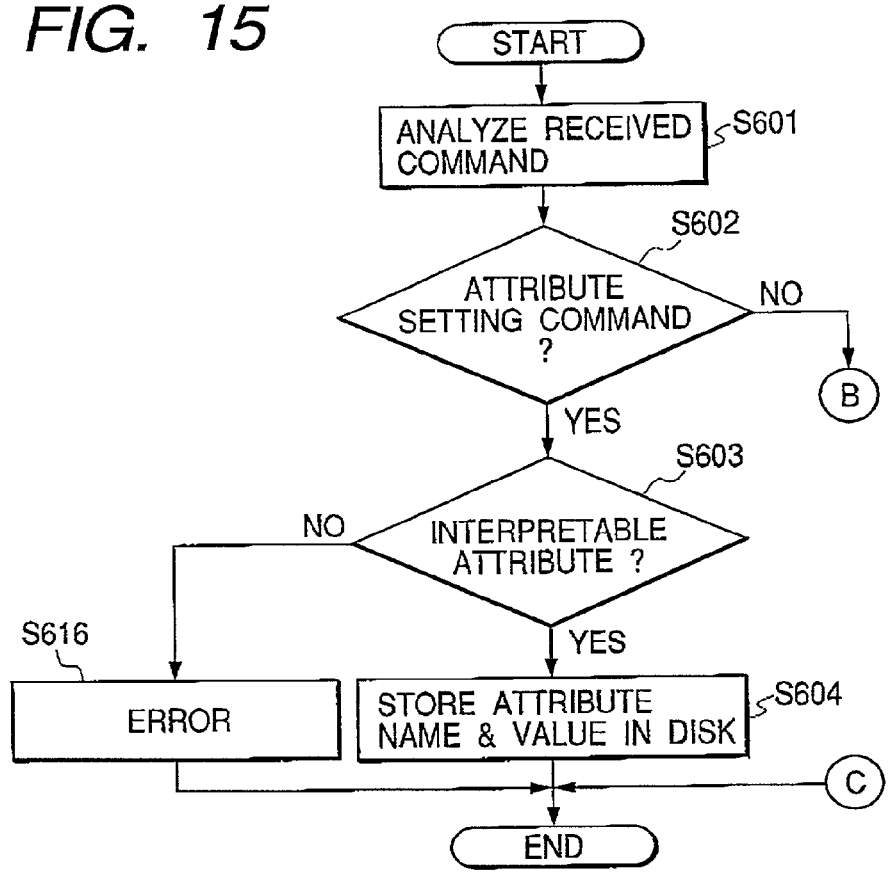
FIG. 15 is a flowchart showing the procedure for receiving a job submitting command when the MFP(1) receives the job issued by the process in FIG. 14.
Figure 16:
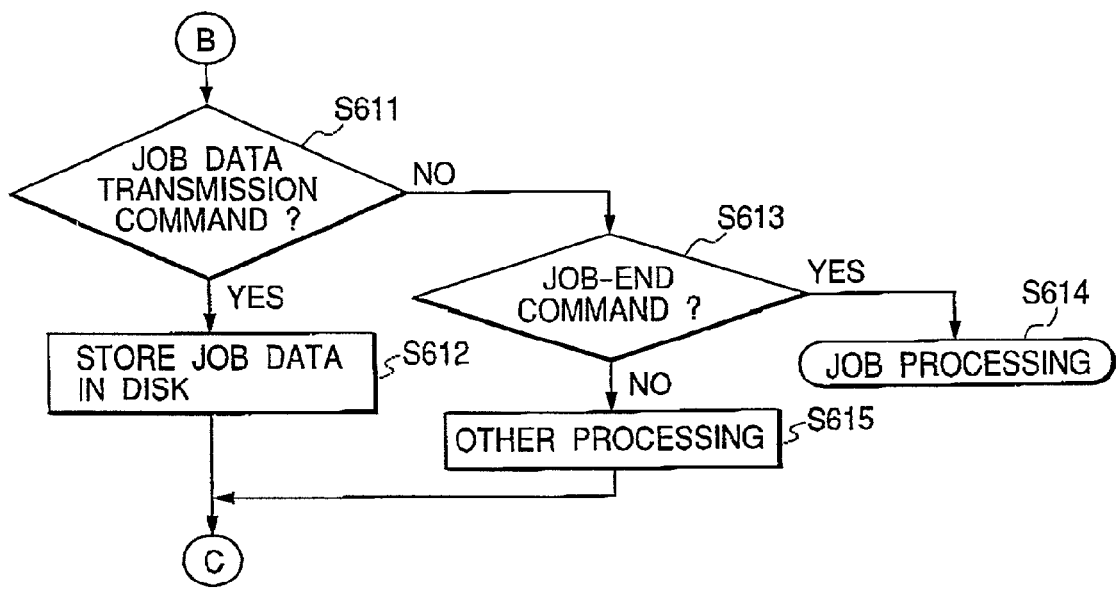
FIG. 16 is a flowchart following FIG. 15 for showing the procedure for receiving the job submitting command when the MFP(1) receives the job issued by the process in FIG. 14.

FIGS. 15 and 16 are flowcharts showing the procedure for receiving a job submitting command when the MFP(1) 1 receives the job issued by the process in FIG. 14. This process is performed by the MFP(1) 1 each time the command constituting the job is received.

The received command and its parameter are analyzed (step S601). As a result of this analysis, it is determined whether or not the received command is the attribute setting command (step S602). In the case where the received command is the attribute setting command, it is determined whether or not the attribute can be interpreted by the MFP(1) 1 (step S603).

In the case where it can be interpreted, a pair of the specified attribute name and attribute value is stored as the job data on the RAM 22 or the disk 30 according to the analysis results obtained in the step S601 (step S604) to finish the process. On the other hand, in the case where it cannot be interpreted in the step S603, it is impossible to set the attribute specified by the received attribute setting command, and so it is communicated in reply that the attribute could not be set (step s616) to finish the process.

On the other hand, in the case where the received command is not the attribute setting command in the step S602, it is determined whether or not the received command is the job data transmission command from the analysis results obtained in the step S601 (step S611). In the case where it is the job data transmission command, the job data received following the command is stored in the RAM 22 or the disk 30 (step S612) to finish the process.

On the other hand, in the case where it is not the job data transmission command in the step S611, it is determined whether or not the received command is a job submitting termination notice command from the analysis results obtained in the step S601 (step S613). In the case where it is the job submitting termination notice command, processing of the job data held in the RAM 22 or the disk 30 is started (step S614). On the other hand, in the case where it is not the job submitting termination notice command, the received command is another command, and a process depending on the other command is performed (step S615) to finish the process.

Figure 17:
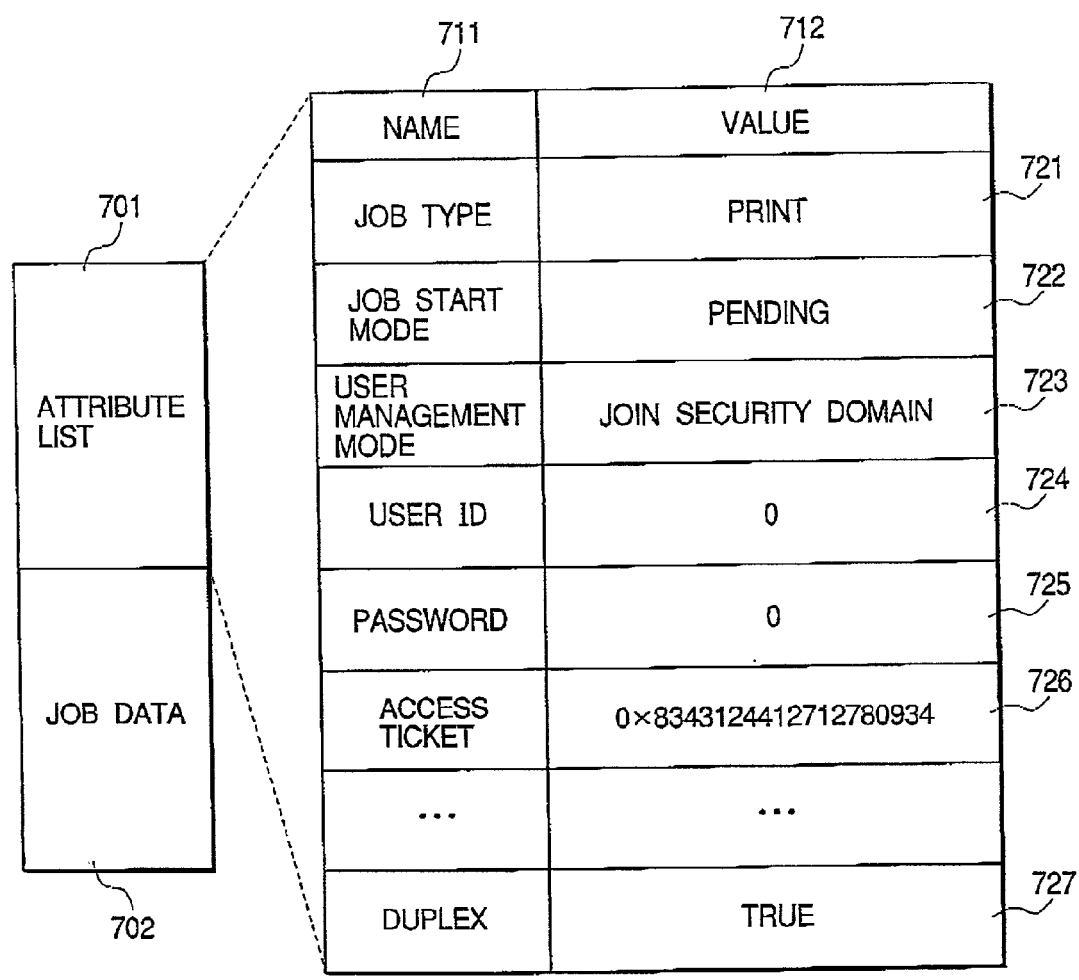
FIG. 17 is a diagram showing a data structure of the job held in the MFP(1) as a result of the process in FIG. 14.

FIG. 17 is a diagram showing the data structure of the job held in the MFP(1) 1 as a result of the process in FIGS. 15 and 16. This job is comprised of an attribute list 701 representing the function and attribute of the job and job data 702 representing the data to be the processing target of the job. The job data 702 is not necessary depending on the job type. The attribute list 701 is the list of a pair of an attribute name 711 and an attribute value 712 corresponding thereto.

In the diagram, reference numeral 721 represents that the job is the printing job. Reference numeral 722 represents that the job starting mode is pending. Reference numeral 723 represents that the user management mode is "Join Security Domain" and indicates that an access ticket 726 is used as the user information on the job Reference numeral 724 denotes the attribute for which the user ID is set in the case where the user management mode is "User ID" or "User ID and Password." Reference numeral 725 denotes the attribute for which the password is set in the case where the user management mode is "Password" or "User ID and Password." Reference numeral 726 denotes the attribute for which the access ticket is set in the case where the user management mode is "Join Security Domain." Moreover, as for the attributes 724, 725 and 726, only what is necessary may be set as the job data according to the contents of the attribute 723.

Figure 18:
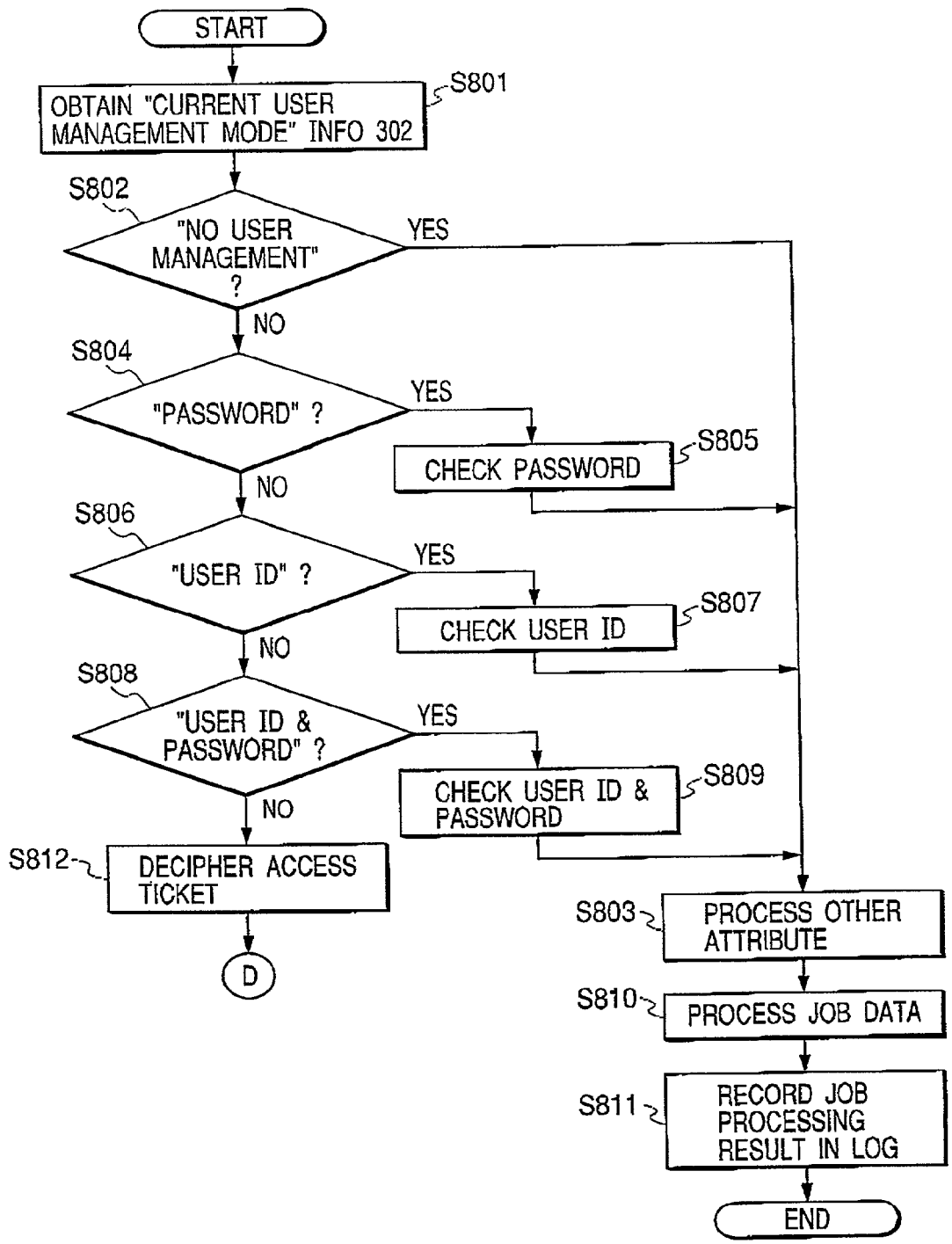
FIG. 18 is a flowchart showing the procedure of the job data held in the MFP(1) shown in FIG. 17.
Figure 19:
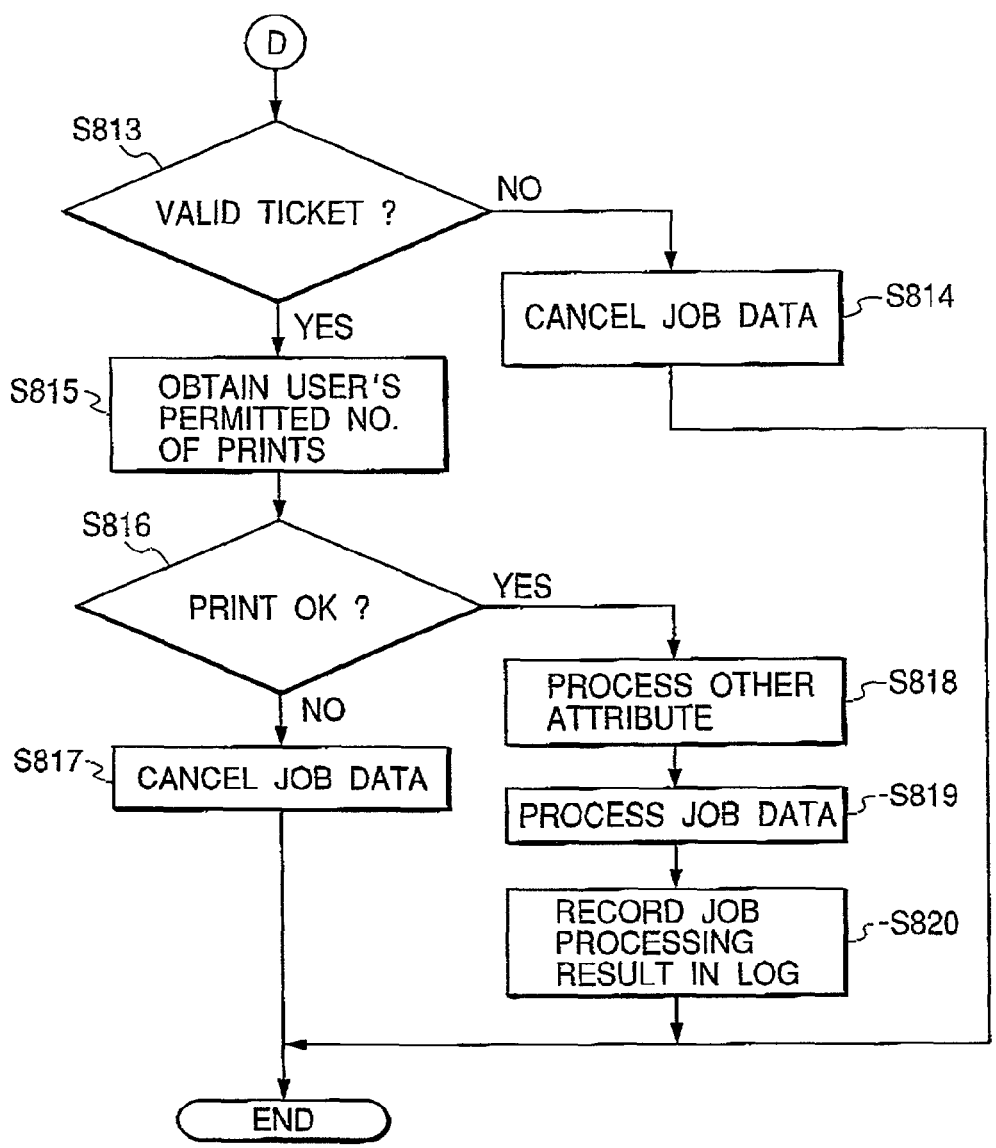
FIG. 19 is a flowchart following FIG. 18 for showing the procedure of the job data held in the MFP(1) shown in FIG. 17.

FIGS. 18 and 19 are flowcharts showing the procedure of the job data held in the MFP(1) 1 shown in FIG. 17. This procedure is performed on the MFP(1) 1. First, the attribute information (current user management mode) 302 is obtained (step S801). It is determined whether or not the value of the attribute information 302 is "No User Management" (step S802).

In the case of "No User Management" as a result of the determination, the processing of the attributes except the attributes 723, 724, 725 and 726 is performed (step S803), and job data processing is performed based on these attributes (step S810). The job processing results are logged (step S811) to finish the process. This log is stored in the RAM 22 or the disk 30.

On the other hand, in the case where there is the user management as a result of the determination in the step S802, it is determined whether or not the value of the attribute information 302 is "Password" (step S804). In the case where it is "Password" as a result of the determination, a password value held in advance in the RAM 22 or the disk 30 is compared to attribute information 725 (step S805), and in the case where they coincide, the job processing is continued in the step S803. On the other hand, in the case there they do not coincide, the job processing is aborted.

On the other hand, in the case where it is not "Password" as a result of the determination in the step S804, it is determined whether or not the value of the attribute information 302 is "User ID" (step S806). In the case where it is "User ID" as a result of the determination, a user ID value held in advance in the RAM 22 or the disk 30 is compared to attribute information 724 (step S807), and in the case where they coincide, the job processing is continued in the step S803. On the other hand, in the case where they do not coincide, the job processing is aborted.

In the case where it is not "User ID" as a result of the determination in the step S806, it is determined whether or not the value of the attribute information 302 is "User ID and Password" (step S808). In the case where it is "User ID and Password" as a result of the determination, the user ID value and the password value held in advance in the RAM 22 or the disk 30 is compared to attribute information 724 and 725 respectively (step S809), and in the case where they coincide, the job processing is continued in the step S603. In the case where they do not coincide, the job processing is aborted.

On the other hand, in the case where it is not "User ID and Password" as a result of the determination in the step S808, the access ticket value 726 is decrypted by using the cryptograph key that is the attribute information 306 (step S812). And it is determined whether or not the access ticket is valid (step S813). In the case where the access ticket value could not be decrypted or the value of the permitted number of prints held in the access ticket is 0. it is determined that the access ticket is invalid in the step S813, and the job data is abandoned (step S814) to finish the process.

On the other hand, in the case where it is determined that the access ticket is valid in the step S813, the permitted number of prints information of the user falling under the user ID in the access ticket is obtained from the directory server 6 by the Kerberos protocol and the LDAP protocol (step S815).

It is determined whether or not it can be printed with the permitted number of prints of one or more (step S816), and in the case where it cannot be printed, the job data is abandoned (step S817) to finish the process. On the other hand, in the case where it can be printed as a result of the determination in the step S816, the processing of the attributes except the attributes 723, 724, 725 and 726 is performed (step S818), and job data processing is performed based on these attributes (step S819). Moreover, this processing is monitored so that the permitted number of prints obtained from the process in the step S815 is not exceeded, and in the case where the maximum number of prints is exceeded, it causes the job data processing to abnormally end. Whether the job normally ends or abnormally ends, the job processing results are logged (step S820) to finish the process. The user ID and the number of prints printed by the job are logged, which is stored in the RAM 22 or the disk 30.

Moreover, while the job data is once constructed in the MFP(1) 1 in the process in FIGS. 15 and 16 and then it is processed again in the process in FIGS. 18 and 19 in this embodiment, it is also feasible, as another embodiment, to unite the process in FIGS. 15 and 16 with the process in FIGS. 18 and 19, thus simultaneously performing a job analysis and the job processing.

In addition, while the permitted number of prints in the access ticket is determined in the step S813, and the permitted number of prints of the user held in the directory server 6 is determined in the steps S815 and S816 in this embodiment, it is also feasible, as another embodiment, to omit either the determination of the permitted number of prints in the access ticket in the step S813 or the determination of the permitted number of prints of the user held in the directory server 6 in the steps S815 and S816.

In addition, while the job results are held as logs in the MFP(1) 1 in the step S820 in this embodiment, it is also feasible to update the permitted number of prints and the accumulated number of prints of the user held in the directory server 6 by the number of prints printed by the job. The permitted number of prints is updated by obtaining the permitted number of prints and the accumulated number of prints indicated by the user ID held in the directory server 6 by the LDAP protocol, subtracting the number of prints printed by the job from the permitted number of prints, and further adding the number of prints printed by the job to the accumulated number of prints, and then setting these obtained values in the directory server 6 by the LDAP protocol.

Figure 20:
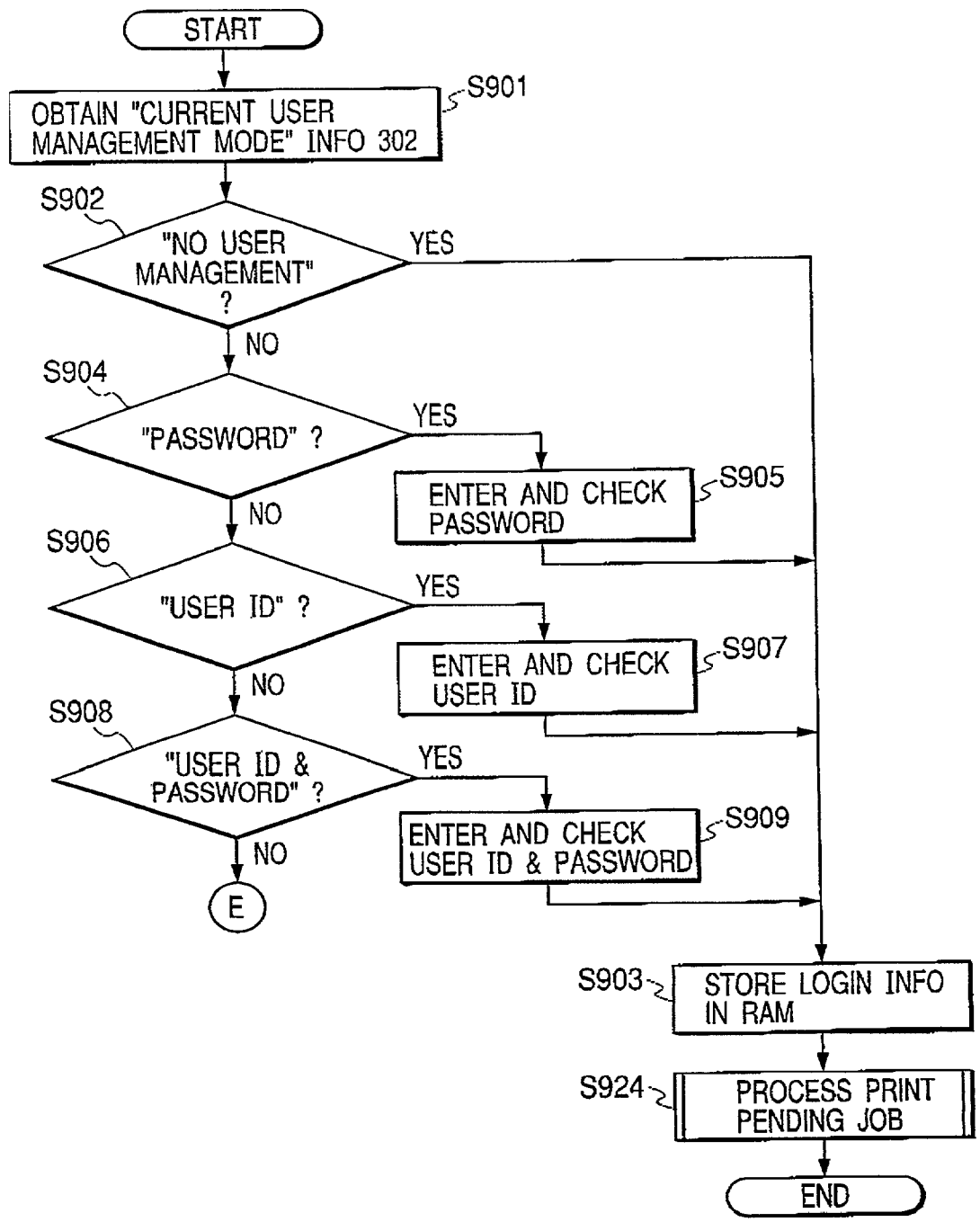
FIG. 20 is a flowchart showing a login procedure from an operation division of the MFP(1)
Figure 21:
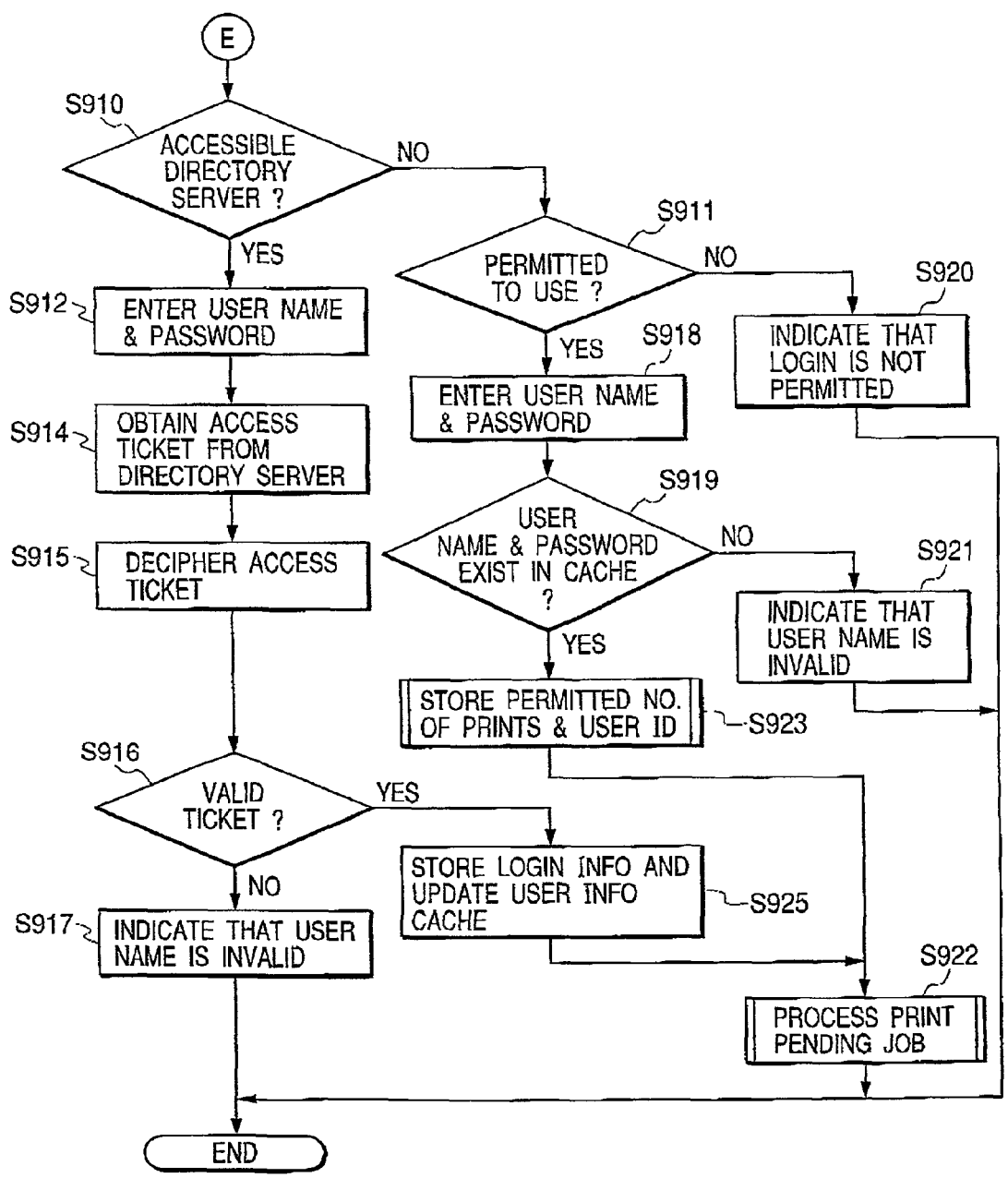
FIG. 21 is a flowchart following FIG. 20 for showing the login procedure from the operation division of the MFP(1)

FIGS. 20 and 21 are flowcharts showing the procedure of the login screen displayed on an LCD 23 of the MFP(1) 1. This process is performed on the MFP(1) 1. First, the attribute information 302 (current user management model is obtained (step S901). It is determined whether or not the value of the attribute information 302 is "No User Management" (step S902).

In the case where it is "No User Management" as a result of the determination, the login information is stored in the RAM 22 (step S903). The login information holds the user management mode, the user ID and the permitted number of prints as of logging in. The permitted number of prints is sequentially updated by the number of prints used in the jobs accompanying printing such as a print job and a copy job issued from the console within a login period, and the job is finished when the value of the permitted number of prints becomes 0. In the step S903, the permitted number of prints is set at infinity. The user ID in the login information is logged together with the number of prints used in the job. After the process of the step S903, a print pending job is processed (step S924) to finish the process.

On the other hand, in the case where there is the user management as a result of the determination in the step S902, it is determined whether or not the value of the attribute information 302 is "Password" (step S904). In the case where there is the password as a result of the determination, the user interface screen prompting for the password is displayed on the LCD 23 and the inputted password is compared to the password value held in advance in the RAM 22 or the disk 30 (step S905), and in the case where they coincide, the login processing is continued in the step S903. In the case where they do not coincide, the processing is aborted as no login allowed.

On the other hands in the case where there is no password as a result of the determination in the step S904, it is determined whether or not the value of the attribute information 302 is "User ID" (step S906). In the case where it is "User ID," the user interface screen prompting for the user ID is displayed on the LCD 23 and the inputted user ID is compared to the user ID value held in advance in the RAM 22 or the disk

30 (step S907), and in the case where they coincide, the login processing is continued in the step S903. In the case where they do not coincide, the processing is aborted as no login allowed.

On the other hand, in the case where it is not the user ID as a result of the determination in the step S906, it is determined whether or not the value of the attribute information 302 is "User ID and Password" (step S908). In the case where it is "User ID and Password" as a result of the determination, the user interface screen prompting for the user ID and the password is displayed on the LCD 23 and the inputted user ID and password are compared to the user ID value and the password value held in advance in the RAM 22 or the disk 30 (step S909), and in the case where they coincide, the login processing is continued in the step S903. In the case where they do not coincide, the processing is aborted as no login allowed.

In the case where it is not "User ID and Password" as a result of the determination in the step S908, an attempt is made to access the directory server shown in the attribute information 305 so as to determine whether or not it is connectable (step S910).

In the case where it is accessible, the user interface screen prompting for the user ID and the password is displayed on the LCD 23 (step S912), and the inputted user ID and password are used to obtain the access ticket from the directory server 6 by the Kerberos protocol (step S914).

On the other hand, in the case where an error is sent in reply from the directory server 6 to the effect that the user name or the password is invalid, such as a case of incorrect user name or password, the user interface screen prompting for the user ID and the password is displayed again in the step S912.

And the access ticket obtained from the directory server is decrypted by using a cryptograph key 306 (step S915). Validity of the access ticket is determined (step S916). This determination is made by checking whether the ticket is within its expiration date and whether the permitted number of prints is one or more. In the case where the access ticket is not valid as a result of the determination in the step S916, the user interface screen representing that the devices may not be used with this user name is displayed on the LCD 23 (step S917) to finish the process.

On the other hand, in the case where the access ticket is valid as a result of the determination in the step S916, the login information is stored and the user cache information is updated (step S925). Of the login information, the number of prints held by the access ticket is set as the permitted number of prints.

FIG. 22 is a diagram showing the data structure of the user information cache. This user information cache is held in the RAM 22 or the disk 30. The user information cache is updated by adding the user name and the password used when obtaining the access ticket, the user ID and the permitted number of prints in the access ticket, and a login time as the data in the case where the same user name already exists in the user information cache, the existing information is updated. And then, after the process of the step S925, a print pending job is processed (step s922) to finish the process.

On the other hand, in the case where it is impossible to access the directory server 6 in the step S910, the attribute information (Permission to Use in case of Inaccessible Directory Server) 307 is obtained to determine whether or not it is available even if the server cannot be connected (step S911). In the case where permission to use is not given, the user interface screen representing that a login is not permitted currently is displayed on the LCD 23 (step S920) to finish the process.

On the other hand, in the case where permission to use is not given in the step S911, the user interface screen prompting for the user name and the password is displayed on the LCD 23 (step S918), and it is determined whether or not the inputted pair of the user name and the password exists in the user information cache held by the RAM 22 or the disk 30 (step 5919). In the case where it does not exist in the user information cache as a result of this determination, the user interface screen representing that the devices may not be used with this user name currently is displayed on the LCD 23 (step S921) to finish the process.

On the other hand, in the case where the pair of the user name and the password exists in the user information cache as a result of the determination in the step S919, the permitted number of prints is computed by the process mentioned later, and this value and the user ID are stored as the login information (step S923). In addition, the value of "Join Security Domain (Inaccessible Directory Server)" is set in the user management rode in the login information. After the process of the step S923, a print pending job is processed (step S922) to finish the process.

The login information stored in this login process is used in order to limit and record operation in issuing jobs in a login session. To be more specific, in the case where the printing is performed exceeding the permitted number of prints in the login information, the job is aborted. In addition, the number of prints printed in the job is subtracted from the permitted number of prints in the login information.

Furthermore, in the case where the user management mode in the login information is "Join Security Domain (Inaccessible Directory Server)," the value is updated by subtracting the number of prints printed in the job from the value of the maximum number of prints 312 or the permitted number of prints of the user information cache 1013 in accordance with the contents of "Limit Types for Use in case of Inaccessible Directory Server" 308 that is the attribute information held in the devices. The user ID in the login information is logged together with the number of prints printed in the job issued in the login session. And the login information is abandoned when the user logs off.

Moreover, even in the case where it is possible to connect to the directory server in this embodiment, the login information holds the permitted number of prints as of logging in in the step S925 and the permitted number of prints is only updated by the job issued from the console within the login period. In the case where it is possible to connect to the directory server, however, it is also feasible to obtain the permitted number of prints of the user held by the directory server immediately before the job is issued and limit the permitted number of prints thereby. In this case, the TGT is included in the login information held in the step S925 and the permitted number of prints of the user held by the directory server 6 immediately before the job is issued is thereby obtained by the Kerberos protocol and the LDAP protocol.

The data of the user information cache to be updated in the process of FIGS. 20 and 21 is held in the RAM 22 or the disk 30 as aforementioned. The data is represented as a set of one record in one line, and one record is comprised of a user name 1010, a password 1011, a user 1012, a permitted number of prints 1013 and a login time 1014.

Figure 23:
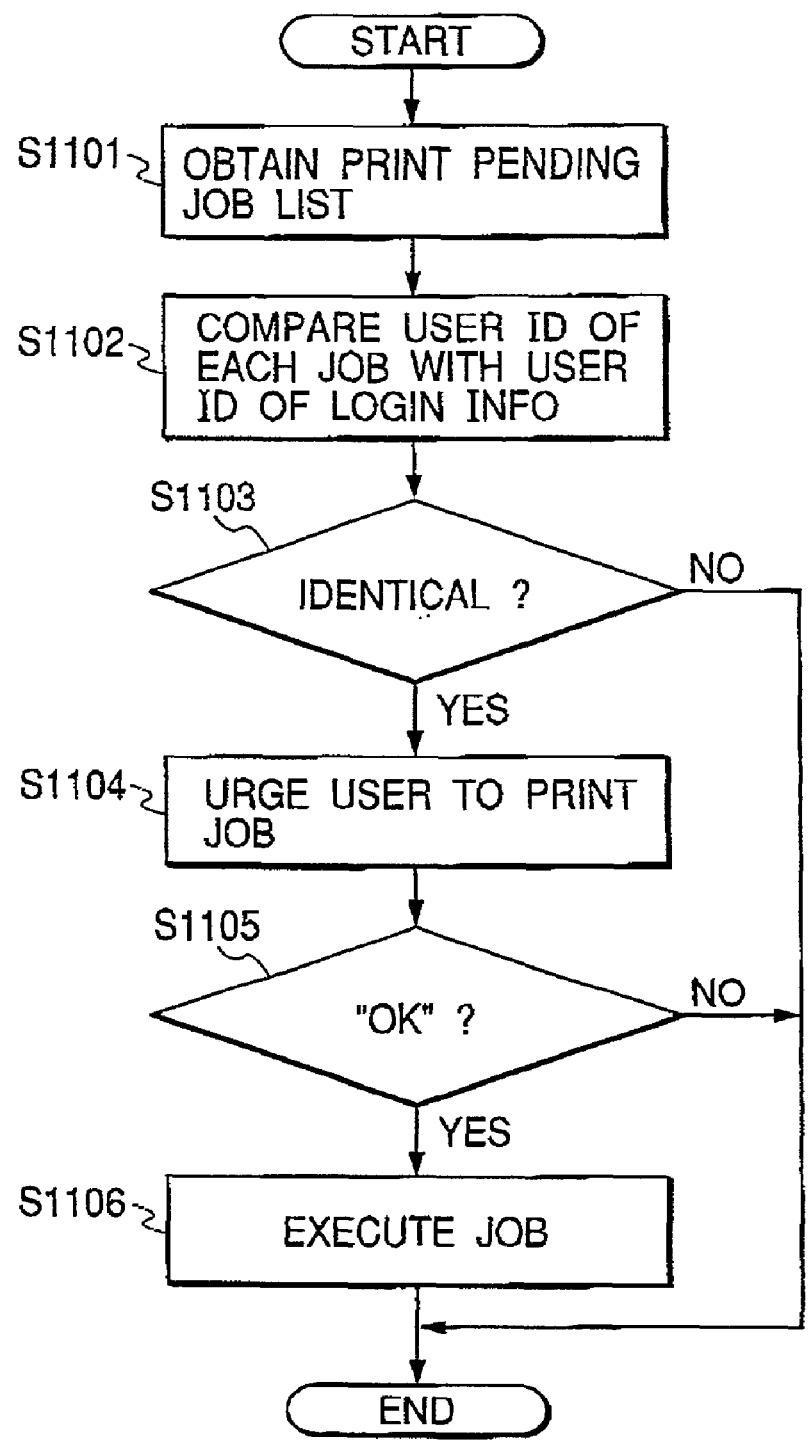
FIG. 23 is a flowchart showing the procedure of a print pending job in steps S924 and S922.

FIG. 23 is a flowchart showing the procedure of the print pending job in the steps S924 and S922. This process in performed on the MFP(1) 1. First, a list of the jobs of which execution of printing is pending in the MFP(1) 1 is obtained (step S1101).

The user ID in the login information held in FIGS. 20 and 21 is compared to the user ID including as the attributes the jobs obtained in the step S1101 so as to create the list of the jobs in which both of them correspond (step S1102). The user IDs of the jobs compared here are obtained and used by decrypting the access ticket in the case where the access ticket 726 exists in the job, and if not, a user ID 724 included in the job is used.

As a result of the process in the step S1102, it is determined whether or not the list is blank (step S1103), and the process is finished in the case where it is not blank as a result of the determination.

Figure 24:
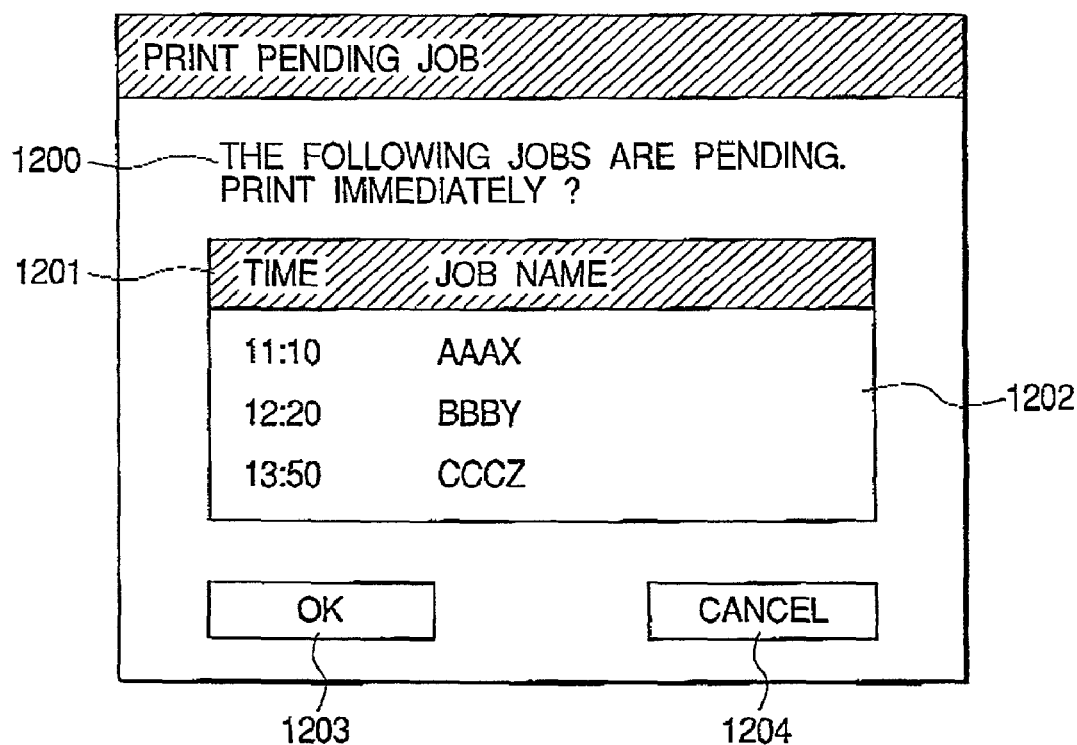
FIG. 24 is a diagram showing the user interface screen displayed on an LCD 23 in a step S1104.

On the other hand, in the case where it is blank in the step S1103, the list of the jobs in which the user IDs correspond is displayed as the user interface screen on the LCD 23 (step S1104). FIG. 24 is a diagram showing the user interface screen displayed on an LCD 23 in the step S1104. In the diagram, 1202 indicates the list of the jobs created in the step S1102. 1203 is the OK button for having the job executed, and 1204 is a cancel button for closing the user interface screen without having the job executed.

And it is determined which of the OK button 1203 and the cancel button 1204 was pushed (step S1105), and in the case where the cancel button was pushed, it is terminated by closing the user interface screen. On the other hand, in the case where the OK button was pushed, the jobs in the list of the jobs created in the step S1102 are executed (step S1106) to finish the process.

Figure 25:
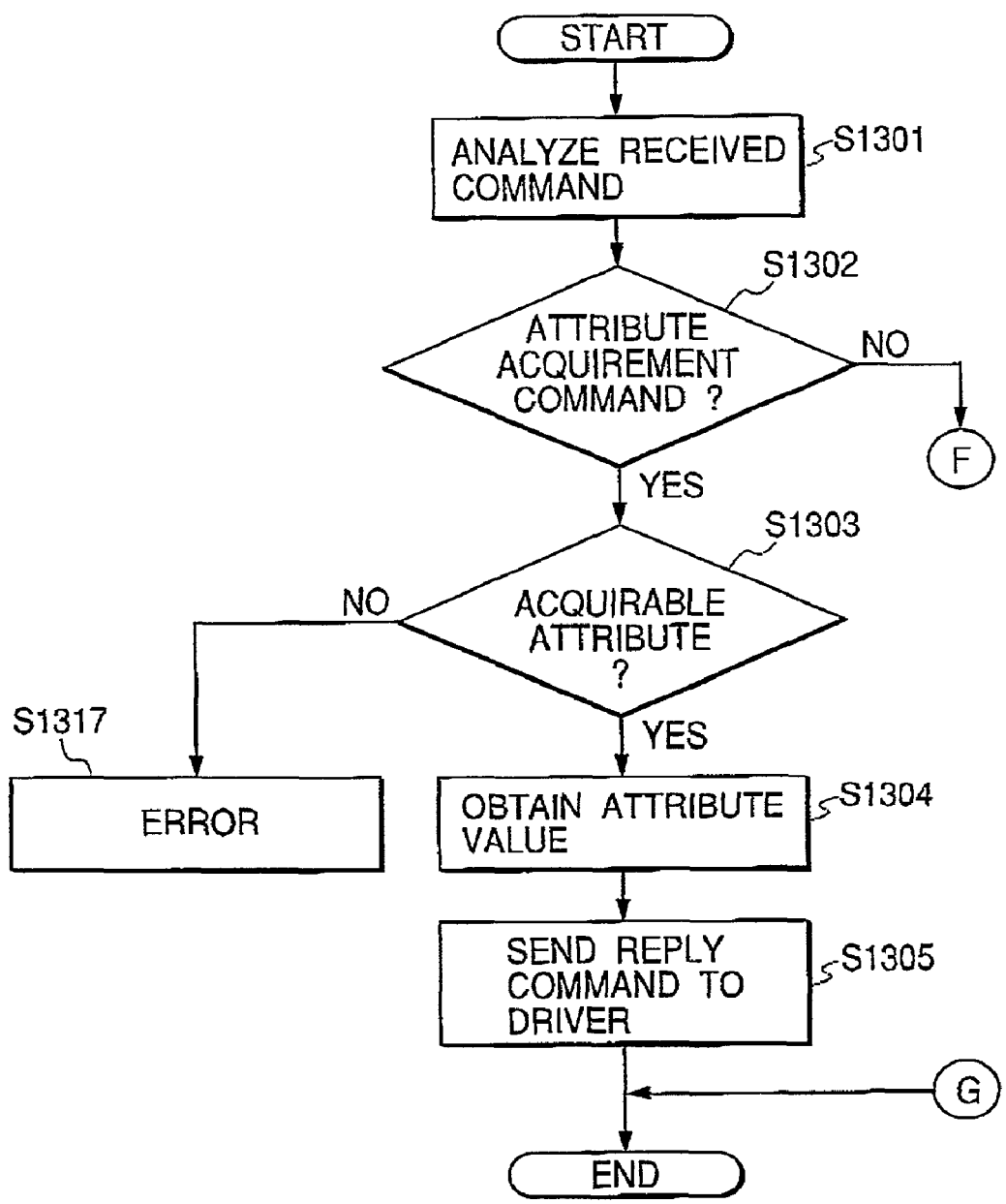
FIG. 25 is a flowchart showing the procedure when the MFP(1) receives an access command for obtaining or setting individual attribute information from the PC(1), the PC(2) and the PC(3)
Figure 26:
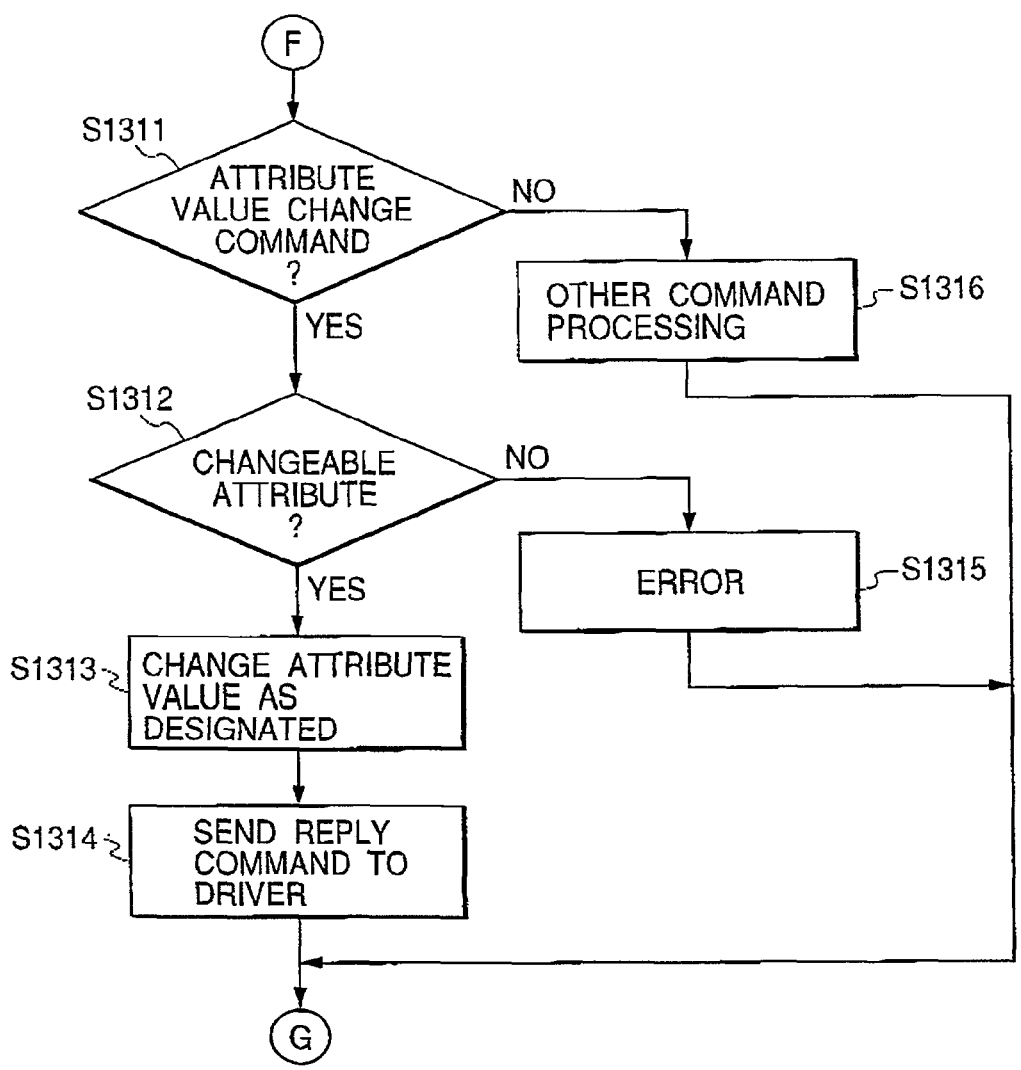
FIG. 26 is a flowchart following FIG. 25 for showing the procedure when the MFP(1) receives an access command for obtaining or setting the individual attribute information from the PC(1), the PC(2) and the PC(3)

FIGS. 25 and 26 are flowcharts showing the procedure when the MFP(1) 1 receives an access command for obtaining or setting individual attribute information from the PC(1) 2, the PC(2) 3 and the PC(3) 4. First, the received command and its parameter are analyzed (step S1301).

It is determined whether or not the received command is an attribute acquirement command from the analysis results (step S1302). In the case where it is the attribute acquirement command, it is determined whether or not the attribute specified by the attribute acquirement command can be acquired (step S1303). In the case where it can be acquired, the value of the attribute held in the MFP is obtained (step S1304), and the obtained attribute value is set as the parameter of a send reply command, and the send reply command to the attribute acquirement command is sent to driver software (step S1305) to finish the process.

On the other hand, in the case where the attribute cannot be acquired in the step S1303, a notice that the attribute acquirement failed is sent to the driver software (step S1317) to finish the process.

On the other hand, in the case where it is not the attribute acquirement command in the step S1302, it is determined whether or not the received command is an attribute value change command from the analysis results in the step 1301 (step S1311). In the case where it is the attribute value change command, it is determined whether or not the attribute specified by the attribute value change command can be changed (step S1312).

In the case where it can be changed, the specified attribute is changed to the specified attribute value according to a specified command parameter (step S1313), and the notice that the attribute value was successfully changed is sent to the driver software (step S1314) to finish the process. On the other hand, in the case where it cannot be changed, the notice that the attribute value change failed is sent to the driver software (step S1315) to finish the process. On the other hand, in the case where it is not the attribute value change command in the step S1311, the received command is another command, and so the process depending on the other command is performed (step S1316) to finish the process.

Figure 27:
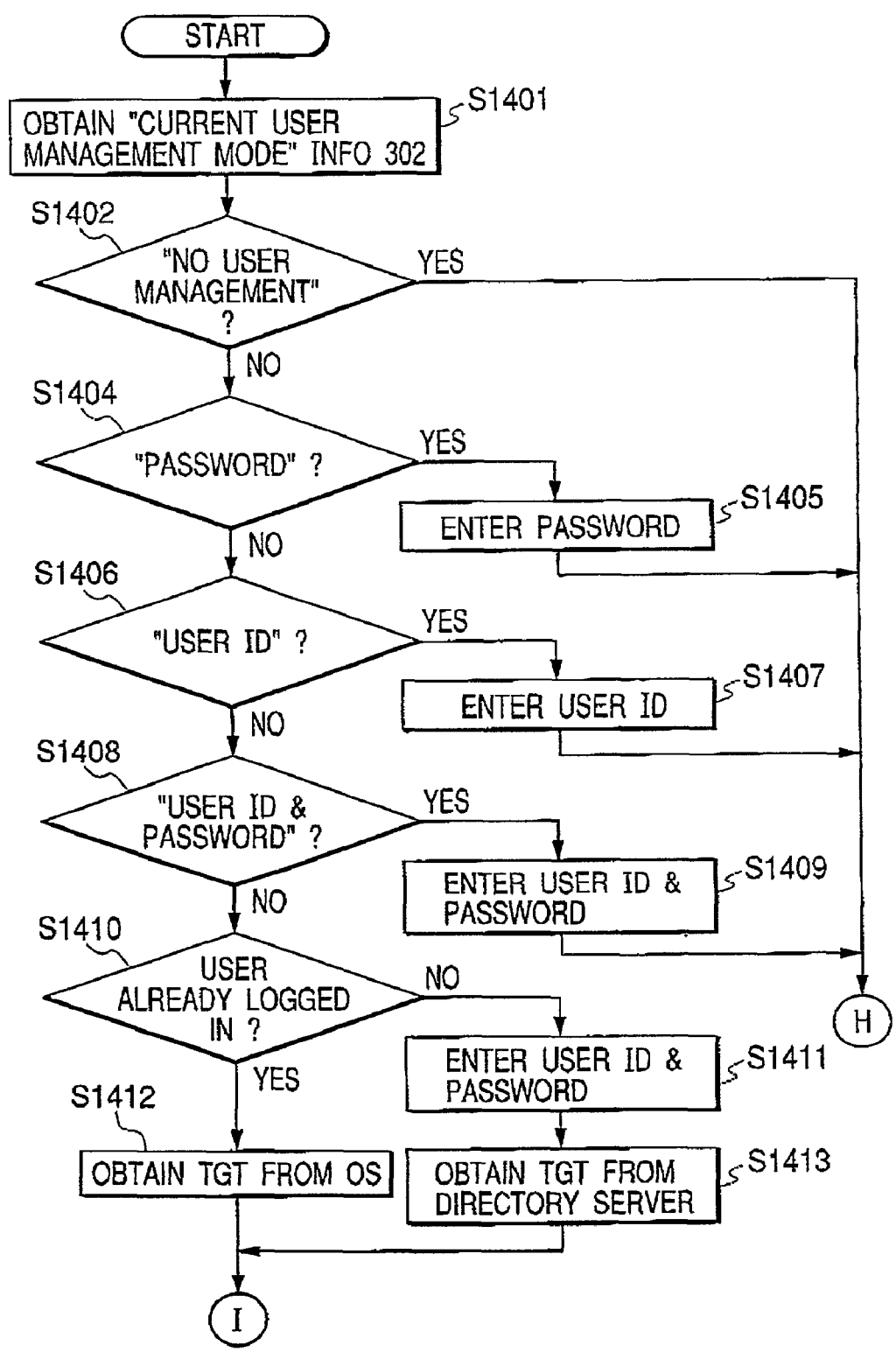
FIG. 27 is a flowchart showing the procedure for issuing a management command such as device management or job management from the PC(1), the PC(2) and the PC(3) to the MFP(1)
Figure 28:
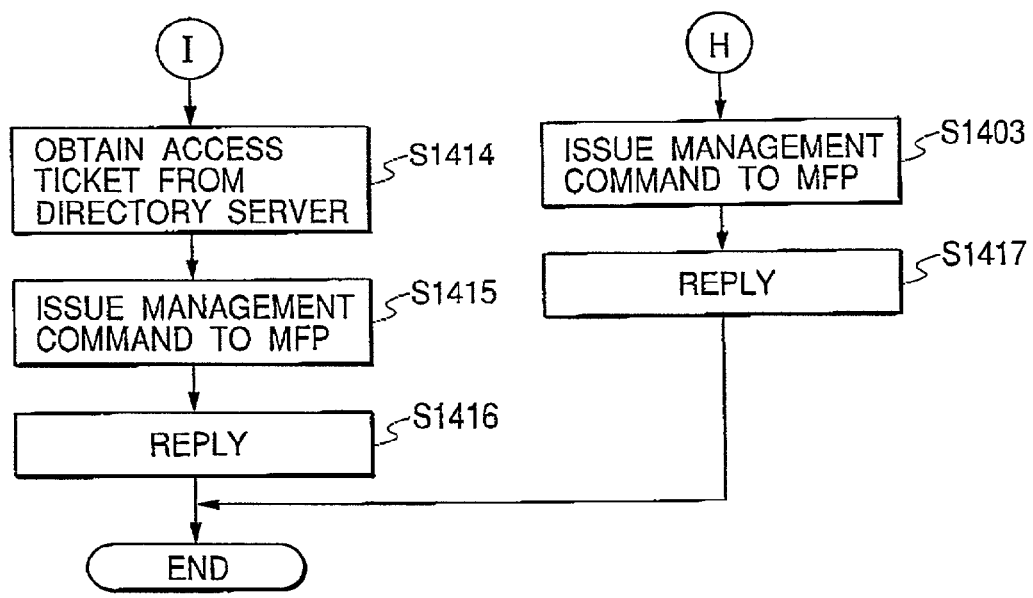
FIG. 28 is a flowchart following FIG. 27 for showing the procedure for issuing a management command such as device management or job management from the PC(1), the PC(2) and the PC(3) to the MFP(1)

FIGS. 27 and 28 are flowcharts showing the procedure for issuing a management command such as device management or job management from the PC(1) 2, the PC(2) 3 and the PC(3) 4 to the MFP(1) 1. This process is performed on the PC(2) 3 and the PC(3) 4 First, the attribute information (current user management mode) 302 held by the MFP(1) 1 is obtained (step S1401).

Figure 29:
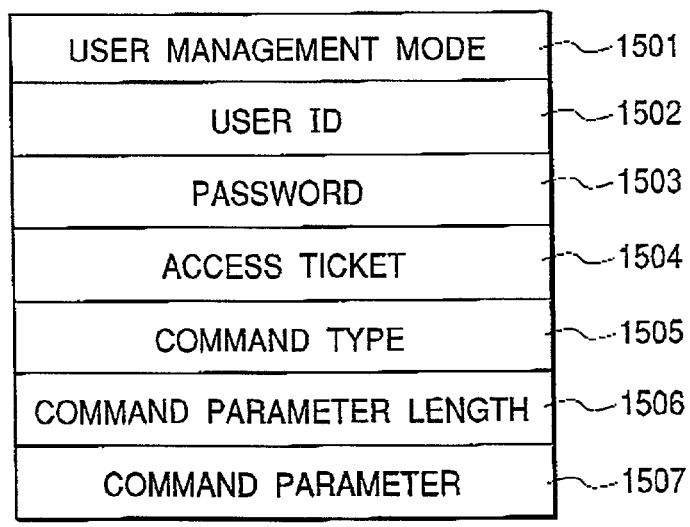
FIG. 29 is a diagram showing the data structure of the management command.

It is determined whether or not the value of the attribute information 302 is "No User Management" (step S1402). In the case where it is "No User Management" as a result of the determination, the management command shown in FIG. 29 is generated and sent to the MFP(1) 1 (step S1403). FIG. 29 is a diagram showing the data structure of the management command In the diagram, reference numeral 1501 represents the user management mode and indicates which information of a user ID 1502, a password 1503 and an access ticket 1504 is valid. In addition, reference numeral 1505 represents a command type. Moreover, reference numeral 1506 represents a length of a parameter 1507 required for the command.

Figure 30:
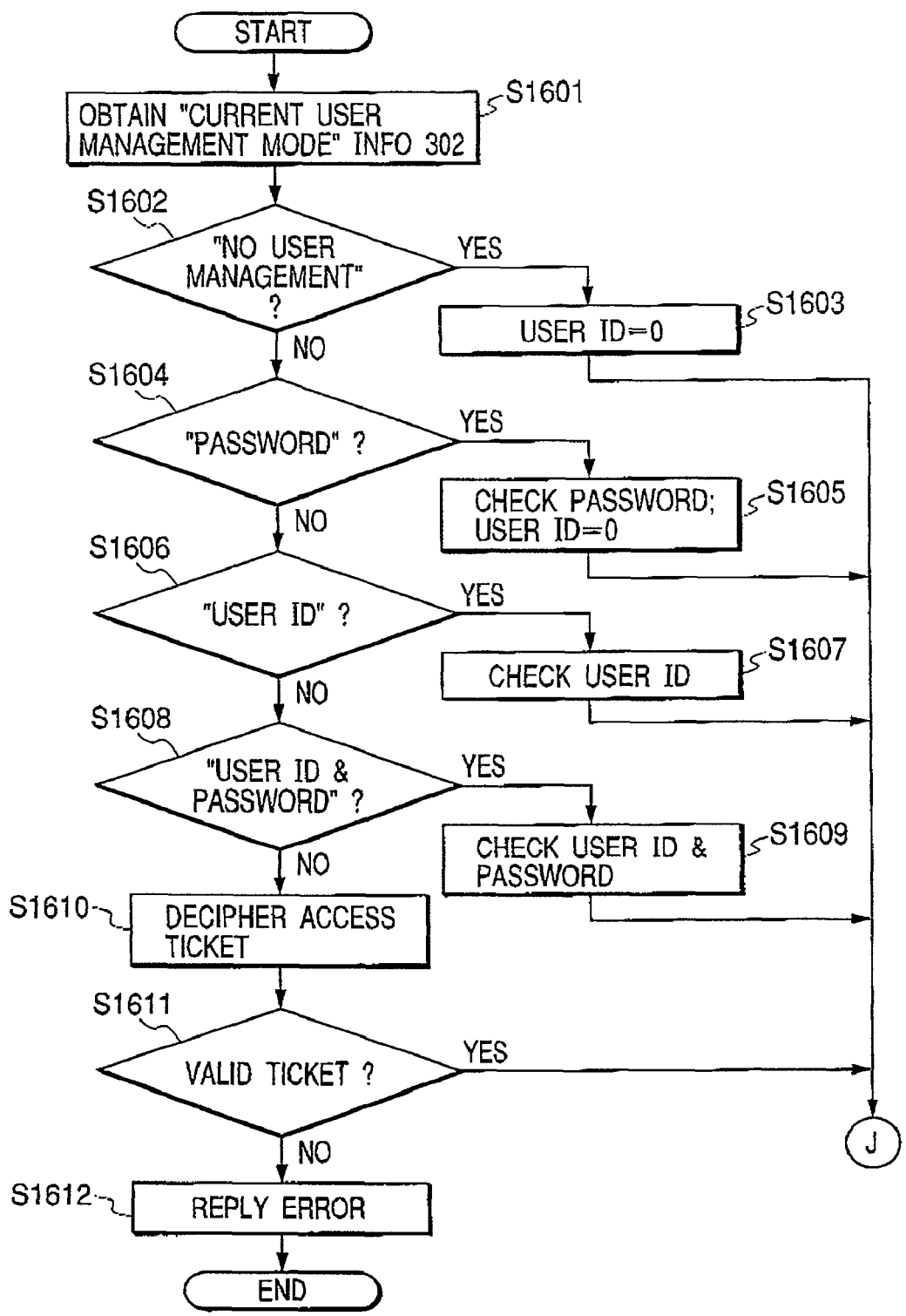
FIG. 30 is a flowchart showing the procedure for MFP(1) to process the management command generated by the process in FIG. 22 and sent to the MFP(1)
Figure 31:
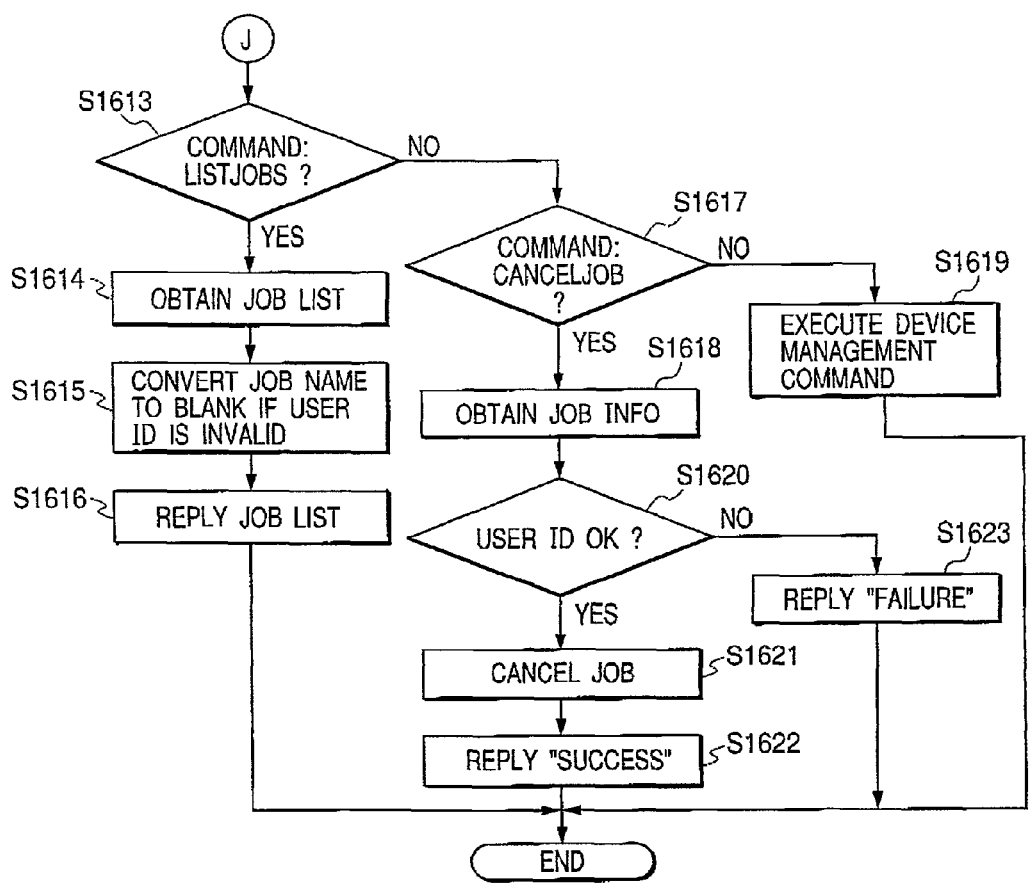
FIG. 31 is a flowchart following FIG. 30 for showing the procedure for MFP(1) to process the management command generated by the process in FIG. 22 and sent to the MFP(1)

The MFP(1) 1 processes the received management command according to the procedure shown in FIGS. 30 and 31, and transmits the results. The reply sent from the MFP(1) 1 is processed (step S1417). This process is different depending of the process of the management command sent in the step S1403, and especially in the case where the management command is "ListJobs" that is a command for obtaining the list of the jobs of which management command is held in the MFP, the list of the jobs included in the reply is displayed as the user interface screen on the CRT 33. This process is finished thereafter.

On the other hand, in the case where there is the user management as a result of the determination in the step S1402, it is determined whether or not the value of the attribute information 302 is "Password" (step S1404). In the case where it is "Password" as a result of the determination, the user interface screen prompting for the password is displayed on the CRT 33 (step S1405). And the management command setting the inputted password is generated and is sent to the MFP(1) 1 in the step S1403.

On the other hand, in the case where there is no password as a result of the determination in the step S1404, it is determined whether or not the value of the attribute information 302 is "User ID" (step S1406). In the case where it is "User ID" as a result of the determination, the user interface screen prompting for the user ID is displayed on the CRT 33 (step S1407). And the management command setting the inputted user ID is generated and is sent to the MFP(1) 1 in the step S1403.

On the other hand, in the case where it is not "User ID" as a result of the determination in the step S1406, it is determined whether or not the value of the attribute information 302 is "User ID and Password" (step S1408). In the case where it is "User ID and Password" as a result of the determination, the user interface screen prompting for the user ID and the password is displayed on the CRT 33 (step S1409). And the management command setting the inputted user ID and the password is generated and is sent to the MFP(1) 1 in the step S1403.

On the other hand, in the case where it is not "User ID and Password" as a result of the determination in the step S1408, it is determined on the PC being used whether or not the user has already logged in to the security domain managed by the directory server 6 (step S1410). This determination is made by inquiring of an operating system of the PC being used.

In the case where the user has not logged in as a result of the determination, the user interface screen prompting for the user ID and password is displayed on the CRT 33 (step S1411), and the information is sent to the directory server 6 by using the Kerberos protocol so as to obtain the TGT (Ticket Generation Ticket) information (step S1413).

On the other hand, in the case where the user has already logged in as a result of the determination in the step S1410, the TGT used in the current session is requested of the operating system and is obtained since the user has already logged in (step S1412).

The TGT obtained in the step S1412 or S1413 and the identifier (parameter) identifying the MFP(1) 1 of the job issue destination are sent to the directory server 6 by the Kerberos protocol to obtain the access ticket for the MFP(1) 1 (step S1414). The access ticket obtained here has the information on the user name, the user ID, the user's permitted number of prints and its expiration date encrypted by cryptograph key 306 of the MFP(1) 1. The data format in the access ticket and the encryption (algorithm) to be used are uniquely determined in advance according to the currently corresponding directory server type 304.

The management command setting the access ticket obtained in the step S1414 is generated and is sent to the MFP(1) 1 (step S1415). The same reply process as in the step S1417 is performed thereafter (step S1416). The process is finished thereafter.

FIGS. 30 and 31 are flowcharts showing the procedure for MFP(1) to process the management command generated by the process in FIGS. 27 and 28 and then sent to the MFP(1) 1. This process is performed on the MFP(1) 1.

First, the attribute information (current user management mode) 302 is obtained (step S1601). It is determined whether or not the value of the attribute information 302 is "No User Management" (step S1602). In the case of "No User Management" as a result of the determination, the value 0 is set on the user ID 1502 in the management command (step S1603), and processing is performed according to the command types from the step S1613 onward.

On the other hand, in the case where there is the user management as a result of the determination in the step S1602, it is determined whether or not the value of the attribute information 302 is "Password" (step S1604). In the case where it is "Password" as a result of the determination, the password value held in advance in the RAM 22 or the disk 30 is compared to the password 1503, and in the case where they coincide, the value 0 is set on the user ID 1502 in the management command (step S1605). Hereafter, processing is performed according to the command types from the step S1613 onward. In the case where they do not coincide, the error is returned and the management command processing is aborted.

On the other hand, in the case where it is not "Password" as a result of the determination in the step S1604, it is determined whether or not the value of the attribute information 302 is "User ID" (step S1606). In the case where it is "User ID" as a result of the determination, the user ID value held in advance in the RAM 22 or the disk 30 is compared to the user ID 1502 (step S1607). In the case where they coincide, processing is performed according to the command types from the step S1613 onward. In the case where they do not coincide, the error is returned and the management command processing is aborted.

In the case where it is not "User ID" as a result of the determination in the step S1606, it is determined whether or not the value of the attribute information 302 is "User ID and Password" (step S1608). In the case where it is "User ID and Password" as a result of the determination, the user ID value and the password value held in advance in the RAM 22 or the disk 30 are compared to the user ID 1502 and the password 1503 respectively (step S1607), and in the case where they coincide, processing is performed according to the command types from the step S1613 onward. In the case where they do not coincide, the error is returned and the management command processing is aborted.

On the other hand, in the case where it is not "User ID and Password" in the step S1608, the value of the access ticket 1504 is decrypted by using the cryptograph key 306 (step S1610). The validity and the expiration date of the access ticket are determined as a result of the decryption (step S1611), and in the case where the access ticket is valid as a result of the determination, the user ID in the access ticket is set as the user ID 1502 in the management command, and processing is performed according to the command types from the step S1613 onward. On the other hand, in the case where the access ticket is invalid as a result of the determination in the step S1611, the error is returned (step s1612), and the management command processing is finished.

In the process from the step S1613 onward, it is determined whether or not the command type 1505 is "ListJobs" (to obtain the list of the jobs) (step S1613). In the case where the command type 1505 is "ListJobs" as a result of the determination, the list of the jobs held in the MFP(1) 1 is obtained (step S1614). At this time, if "Current User Management Mode" 302 is "Join security Domain," the access ticket 726 of each job is decrypted with the cryptograph key 306 and the obtained user ID is set as the user ID 724 of the job.

And the user ID 724 of the job obtained in the step S1614 is compared to the user ID 1502 included in the management command, so that the job name of the job wherein they do not correspond is converted into a blank (step S1615). On the other hand, the job name of the job wherein they correspond is not converted into a blank. The job list obtained in the step S1615 is returned (step S1616) and the process is finished.

On the other hand, it is determined whether or not the command type 1505 is "CancelJob" (to cancel a specified job) as a result of the determination in the step S1613 (step S1617). In the case where the command type 1505 is not "CancelJob" as a result of the determination, the device management command is processed (step S1619) to finish the process. In the processing of the device management command in the step S1619, a plurality of device management commands may be processed by dividing them into cases by using the command type 1505.

As a result of the determination in the step S1617, the information on the specified job is obtained (step S1618). In the case where "Current User Management Mode" 302 is "Join Security Domain" at this time, the access ticket 726 of the job is decrypted with the cryptograph key 306 and the obtained user ID is set as the user ID 724 of the job.

And the user ID 724 of the job is compared to the user ID 1502 included in the management command (step S1620), and in the case where they do not correspond, it is replied that the execution of the management command failed (step S1623) to finish the process. On the other hand, in the case where they correspond in the step S1620, the specified job is cancelled (step S1621), and it is replied that the execution of the management command was successful (step S1622) to finish the process.

Moreover, it is possible, by changing the process in the step S1621, to have the job management other than a job cancel to which a job access control function is added (a temporary halt, a restart, an interruption, higher priority and lower priority of the job, for instance) performed.

Figure 32:
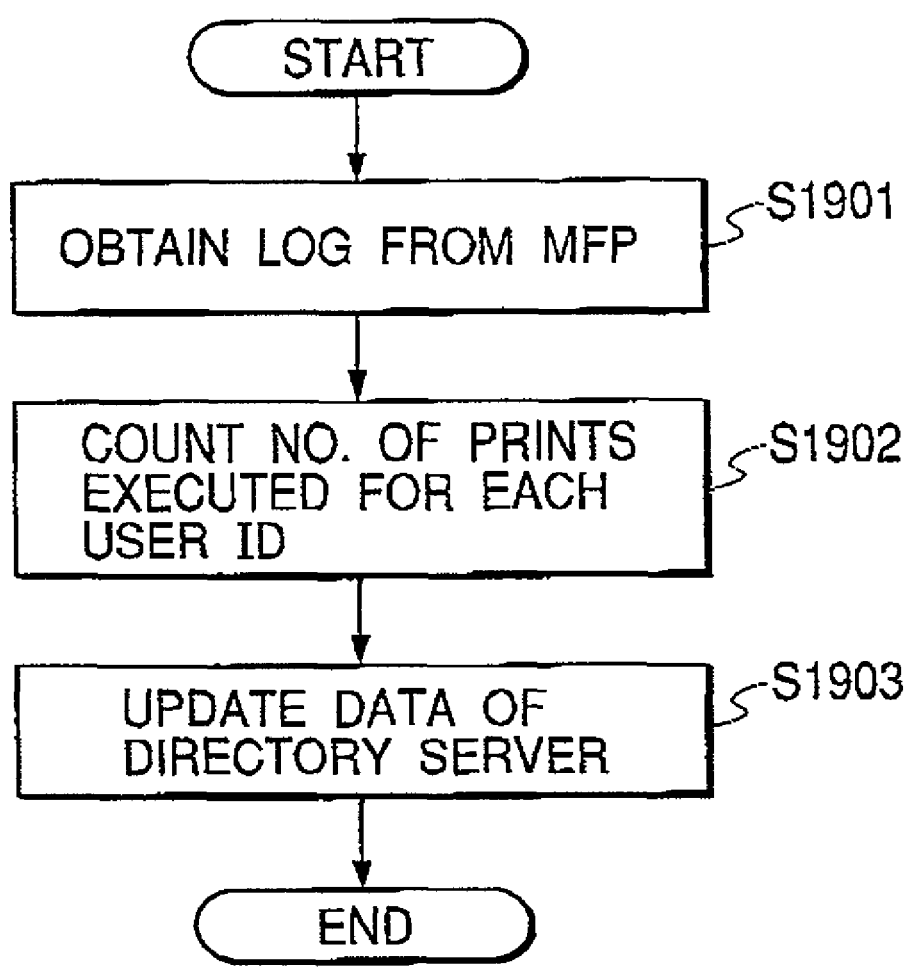
FIG. 32 is a flowchart showing the procedure for totaling the logs of the MFP(1) and the MFP(2) and updating the permitted number of prints and the number of accumulated prints for each user of the directory server 6.

FIG. 32 is a flowchart showing the procedure for totaling the logs of the MFP(1) 1 and the MFP(2) 5 and updating the permitted number of prints and the number of accumulated prints for each user of the directory server 6. This process is performed on the directory server 6. First, the logs are obtained from the subject MFPs (step S1901).

The number of prints printed for each user ID is totaled from the log information (step S1902). The permitted number of prints and the accumulated number of prints of each user are obtained from the directory server 6 by the LDAP protocol, and the obtained number of prints is subtracted from the permitted number of prints, and is further added to the accumulated number of prints, and then the obtained results are set in the directory server 6 by the LDAP protocol (step S1903). Thus, the permitted number of prints and the accumulated number of prints for each user in the directory server 6 are updated.

Thus, the process in FIG. 32 is performed to the MFP(1) 1 and the MFP(2) 5 so that the permitted number of prints and the accumulated number of prints for the two MFPs are centrally managed by the directory server 6.

Moreover, as another embodiment, in the case where the data of the directory server 6 is updated by connecting to the directory server 6 each time the job is finished without logging the number of prints used in the job, it is not necessary to perform the process in FIG. 32.

Figure 33:
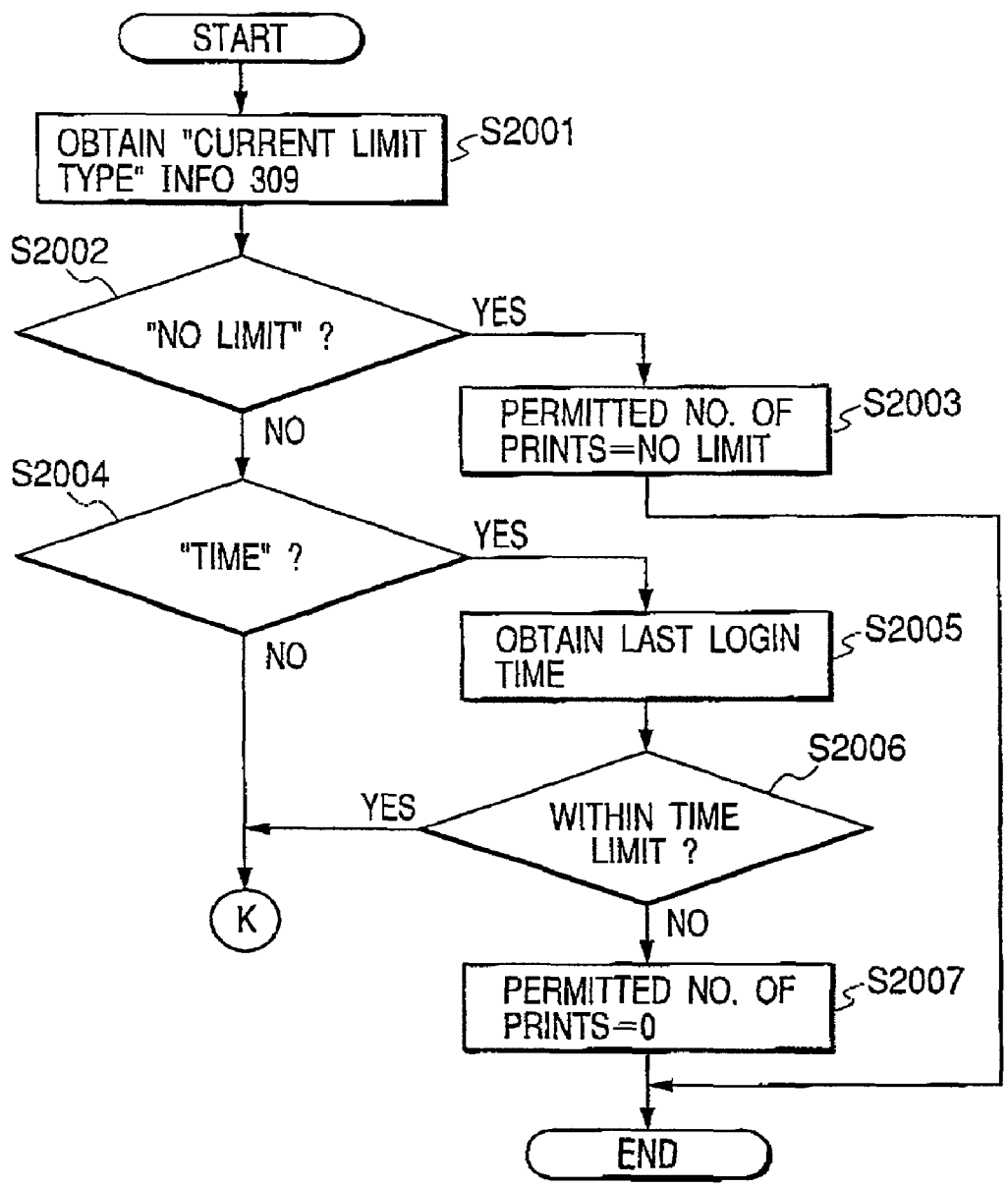
FIG. 33 is a flowchart showing a computing procedure for computing the permitted number of prints when it is impossible to connect to the directory server in the step S923 in FIG. 17.
Figure 34:
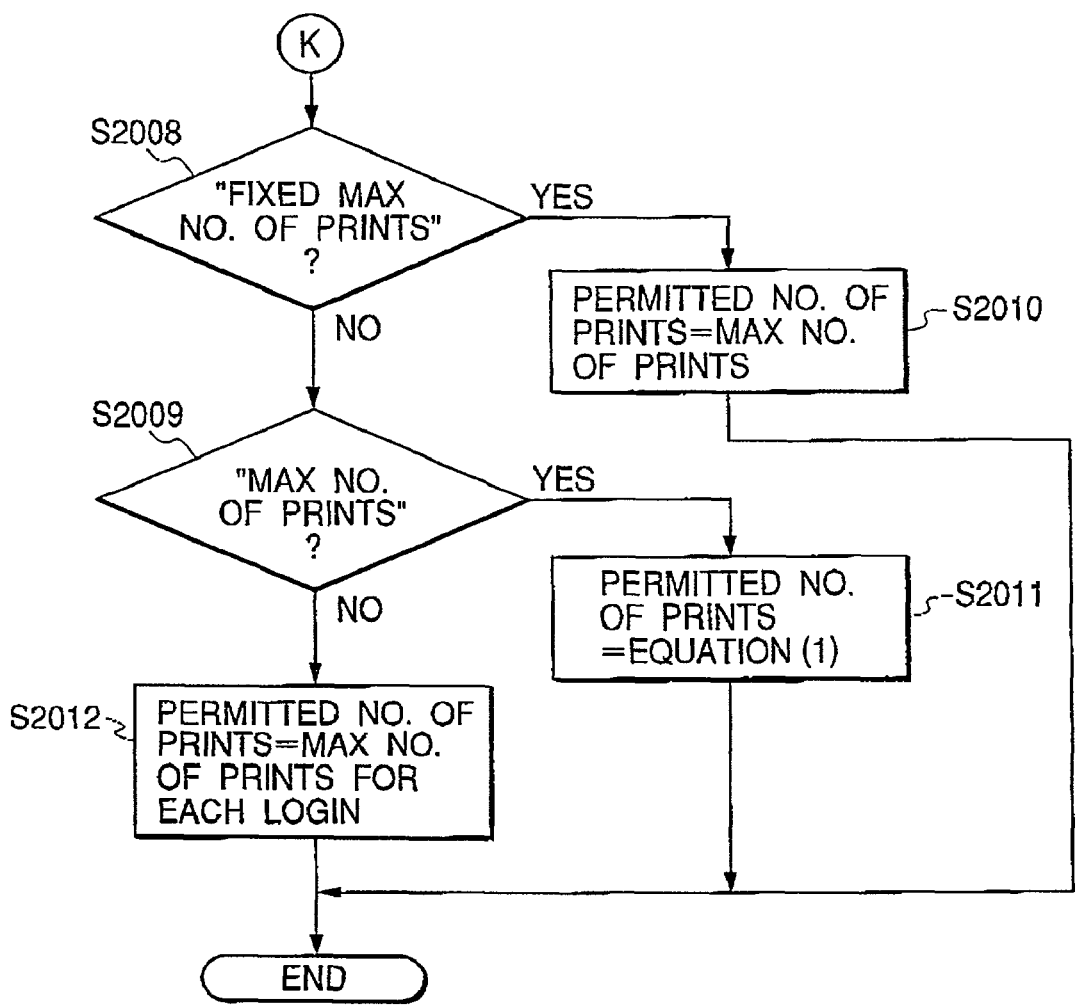
FIG. 34 is a flowchart following FIG. 33 for showing a computing procedure for computing the permitted number of prints when it is impossible to connect to the directory server in the step S923 in FIG. 17.

FIGS. 33 and 34 are flowcharts showing a computing procedure for computing the permitted number of prints when it is impossible to connect to the directory server in the step S923 in FIGS. 20 and 21. This process is performed on the MFP(1) 1. Firsts Current Limit Type for Use in case of Inaccessible Directory Server 309 is obtained (step S2001).

It is determined whether or not the limit type 309 is "No Limit" (step S2002). In the case where it is no limit as a result of the determination, the permitted number of prints is set as infinity (step S2003) to finish the process. On the other hand, in the case where it is not no limit as a result of the determination in the step S2002, it is determined which of "Time," "Time and Fixed Max No. of Prints," or "Time and Max No. of Prints" the limit type 309 is (step S2004). In the case it falls under one of them as a result of the determination, the user's final login time 1014 in the user information cache is obtained (step S2005), and it is determined whether the time difference between this time and the current time is the value specified by the time limit length 310 or less (step S2006).

In the case where it is the specified value or less, the permitted number of prints is set at 0 (step S2007) to finish the process. On the other hand, in the case where it is not any of "Time" "Time and Fixed Max No. of Prints," or "Time and Max No of Prints" or in the case where it is within the time limit in the step S2006 as a result of the determination in the step S2004, it is determined which of "Fixed Max No. of Prints," or "Time and Fixed Max No. of Prints" the limit type 309 is (step S2008).

In the case where it is either "Fixed Max No. of Prints," or "Time and Fixed Max No. of Prints," the value of the maximum number of prints 312 is set as the permitted number of prints (step S2010) to finish the process. On the other hand, in the case where it is neither "Fixed Max No. of Prints," nor "Time and Fixed Max No. of Prints," as a result of the determination in the step S2008, it is determined which of "Max No. of Prints," or "Time and Max No. of Prints" the limit type 309 is (step S2009). In the case where it is either "Max No. of Prints," or "Time and Max No. of Prints," the number of prints is calculated by the following equation (1) so as to set it as the permitted number of prints (step S2011) to finish the process.

$$\text{Permitted No. of Prints} = \text{Permitted No. of Prints in User Information Cache } 1013 - \text{Reduction Rate of Max No. of Prints per Day} \times \text{Time (Days) from Final Login} \quad (1)$$

Here, the Time (Days) from Final Login is calculated by subtracting the current time from the user information cache login time 1014, dividing that time by the value 24 and dropping the fractional portion.

On the other hand, in the case where it is neither "Max No. of Prints," nor "Time and Max No. of Prints," as a result of the determination in the step S2009, Max No. of Prints for each Login 313 is set as the permitted number of prints (step S2012) to finish the process.

Moreover, while "Supported User Management Modes," "Adaptive Directory Server Types," and "Limit Types for Use in case of Inaccessible Directory Server" are obtained by the PC(1) 2, the PC(2) 3 and the PC(3) 4 directly from the MFP(1) 1 according to the procedures shown in the flowcharts in FIGS. 6, 8 and 10 respectively in this embodiment, it is also feasible, as another embodiment, to obtain "Supported User Management Modes," "Adaptive Directory Server Types," and "Limit Types for Use in case of Inaccessible Directory Server" from the MFP(1) 1 and hold them as the device information in the directory server 6 once so that the PC(1) 2, the PC(2) 3 and the PC(3) 4 will obtain them from the directory server 6.

Second Embodiment

While the access ticket is included in the management command in FIG. 29 in the above described first embodiment, a data size of the access ticket is generally larger than other data sizes of the management commands, which may result in a problem in performance and so on. A peripheral equipment control system to solve this problem will be described as the second embodiment below.

FIG. 35 is a diagram showing the data structure of the management command generated by a management command generation process mentioned later and sent to the MFP(1). In the diagram. reference numeral 2301 denotes the user management mode and indicates which information of a user ID 2302, a password 2303 and a session key 2304 is valid.

The session key 2304 is issued by the MFP(1) 1 and is associated with the access ticket one to one by an access ticket cache in the MFP(1) 1. In the diagram, reference numeral 2305 denotes the command type. Reference numeral 2306 denotes the length of a parameter 2307 required for the command.

FIG. 36 is a diagram showing the data structure of the access ticket cache held in the RAM 22 by the process of the access ticket setting command mentioned later. The access ticket cache is comprised of a plurality of records, wherein one record is a pair of a session key 2401 and an access ticket 2402. The access ticket held here is one after decryption by using the cryptograph key 306.

Figure 37:
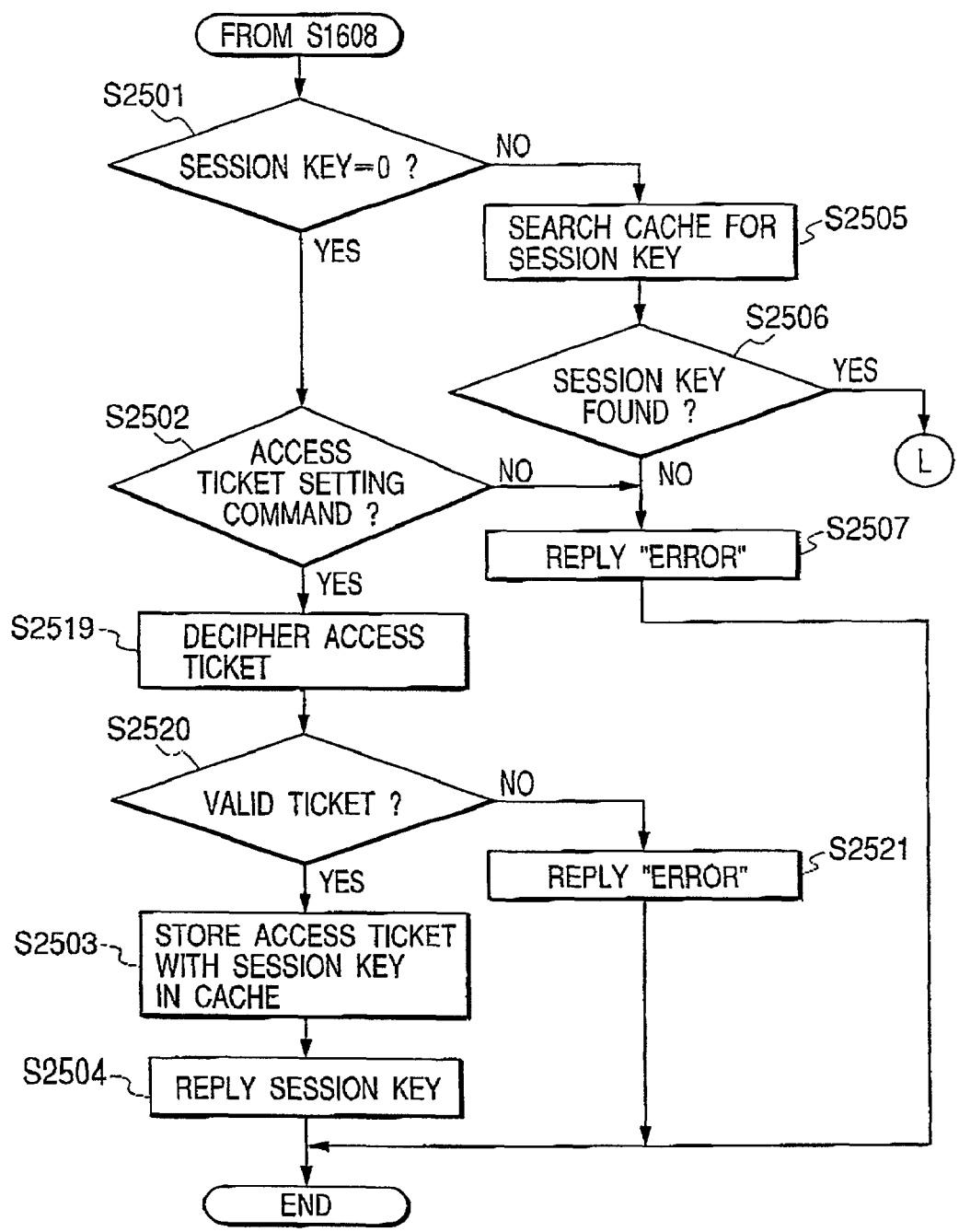
FIG. 37 is a flowchart showing the procedure for MFP(1) to process the management command generated by a management command generation process mentioned later and sent to the MFP(1)
Figure 38:
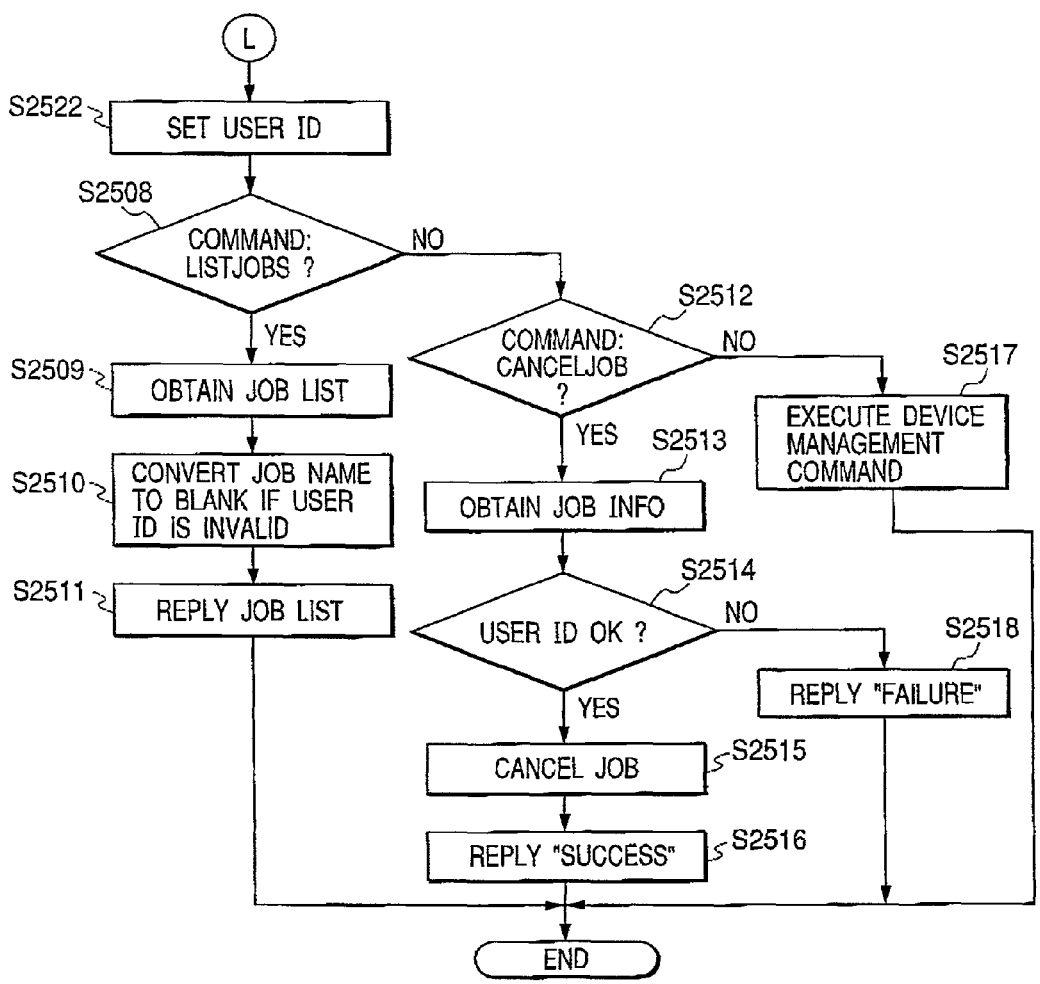
FIG. 38 is a flowchart following FIG. 37 for showing the procedure for MFP(1) to process the management command generated by the management command generation process mentioned later and sent to the MFP(1)

FIGS. 37 and 38 are flowcharts showing the procedure for MFP(1) to process the management command generated by a management command generation process mentioned later and sent to the MFP(1). This procedure is performed on the MFP(1) 1. As the step processing up to the step S1608 in FIGS. 30 and 31 are the same in this procedure, that step processing is omitted, and the case where the determination process in the step S1608 is NO (false), that is, the case where the user management mode is "Join Security Domain" will be described first.

First, it is determined whether or not the session key 2304 has the value 0 (step S2501). In the case where the session key 2304 has the value 0 as a result of the determination in the step S2501, it is determined whether or not the management command type 2305 is the "access ticket setting command" (step S2502). In the case where it is not the "access ticket setting command," the error is returned (step S2507) to finish the process.

On the other hand, in the case where it is the "access ticket setting command" as a result of the determination in the step S2502, the value of the access ticket included in the management command parameter 2307 is decrypted by using the cryptograph key 306 (step S2519). As a result of the decryption, the validity and the expiration date of the access ticket are determined (step S2520).

In the case where the access ticket is not valid, the error is returned (step S2521) to finish the processing of the management command. On the other hand, in the case where the access ticket is valid as a result of the determination in the step S2520, the session key corresponding to the access ticket one to one is generated, and the contents of the decrypted access ticket are stored in the access ticket cache together with the session key (step S2503). The generated session key is returned (step S2504) to finish the process.

On the other hand, in the case where the session key has any value other than 0 in the step S2501, the session key is searched for in the access ticket cache (step S2505), and it is determined whether or not the session key exists (step S2506). As a result of the determinations the error is returned (step S2507) to finish the process.

On the other hand, in the case where the session key exists as a result of the determination in the step S2506, the access ticket corresponding to the session key is obtained from the access ticket cache, and the user ID in the access ticket is set as the user ID 2302 in the management command (step S2522) and processing is performed according to the command type from the step S2508 onward.

In the process from the step S2508 onward, it is determined whether or not the command type 2305 is "ListJobs" (to obtain the list of the jobs) (step S2508). In the case where the command type 2305 is "ListJobs" as a result of the determination, the list of the jobs held in the MFP(1) 1 is obtained (step S2509). At this time, if "Current User Management Mode" 302 is "Join Security Domain," the access ticket 726 of each job is decrypted with the cryptograph key 306 and the obtained user ID is set as the user ID 724 of the job.

The user ID 724 of the job obtained in the step S2509 is compared to the user ID 2302 included in the management command, so that the job name of the job wherein they do not correspond is converted into a blank (step S2510). The obtained job list is returned (step 52511) to finish the process.

On the other hand, it is determined whether or not the command type 1505 is "CancelJob" (to cancel a specified job) as a result of the determination in the step S2508 (step S2512). In the case where the command type 2305 is not "CancelJob," the device management command is processed (step S2517) to finish the process. In the processing of the device management command in the step S2517, a plurality of device management commands may be processed by dividing them into cases by using the command type 2305.

On the other hand, in the case where the command type 1505 is "CancelJob" as a result of the determination in the step S2512, the information of the specified job is obtained (step S2513). At this time, if "Current User Management Mode" 302 is "Join Security Domain," the access ticket 726 of the job is decrypted with the cryptograph key 306 and the obtained user ID is set as the user ID 724 of the job.

And the user ID 724 of the job is compared to the user ID 2302 included in the management command (step S2514), and in the case where they do not correspond, it is replied that the execution of the management command failed (step S2518) to finish the process.

On the other hand, in the case where they correspond in the step S2514, the specified job is cancelled (step S2515), and it is replied that the execution of the management command was successful (step S2516) to finish the process.

Moreover, it is also possible, by applying the management command procedure shown in FIGS. 37 and 38 when processing the job, to have the session key included in the job instead of having the access ticket included in the job as shown in FIGS. 17, 18 and 19.

Figure 39:
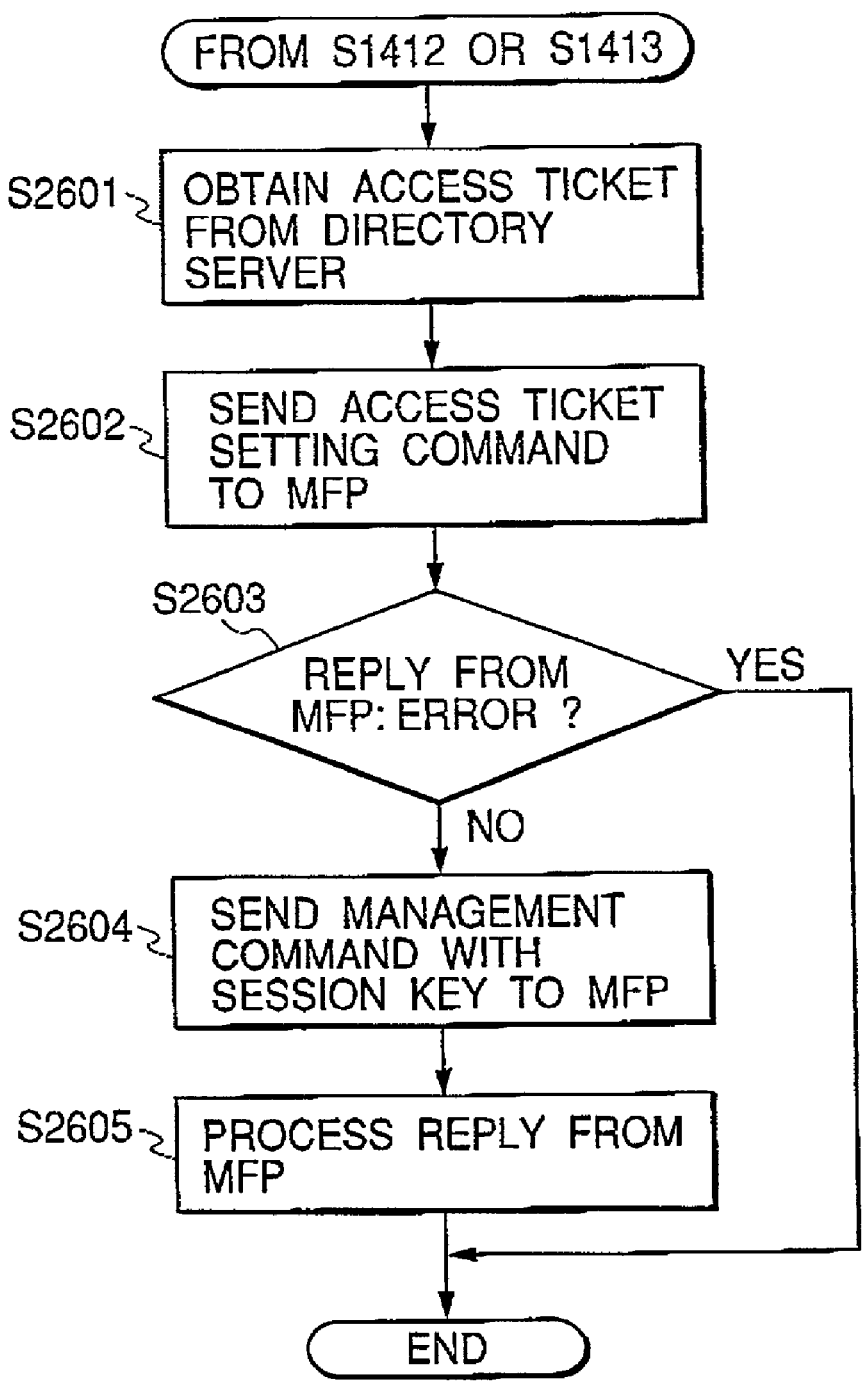
FIG. 39 is a flowchart showing the procedure for issuing a management command such as device management or job management from the PC(1), the PC(2) and the PC(3) to the MFP(1) performing the process in FIG. 29.

FIG. 39 is a flowchart showing the procedure for issuing the management command such as the device management or the job management from the PC(1) 2, the PC(2) 3 and the PC(3) 4 to the MFP(1) 1 performing the process in FIGS. 37 and 38. This procedure is performed on the PC(1) 2, the PC(2) 3 and the PC(3) 4. As this procedure is the same up to the steps S1412 and S1413 in FIGS. 27 and 28, the procedure after the TGT is obtained by the steps S1412 or S1413 is described here.

To be more specific, the TGT obtained in the step S1412 or S1413 and the identifier (parameter) identifying the MFP(1) 1 of the job issue destination are sent to the directory server 6 by the Kerberos protocol to obtain the access ticket for the MFP(1) 1 (step S2601). The access ticket obtained here has the information on the user name, the user ID, the user's permitted number of prints and its expiration date that are encrypted by the cryptograph key 306 of the MFP(1) 1. The data format in the access ticket and encryption (algorithm) to be used are uniquely determined in advance according to the currently corresponding directory server type 304.

The access ticket setting command wherein the access ticket obtained in the step S2601 is set as the command parameter 2307 is generated and sent to the MFP(1) 1 (step S2602). As for the management command sent here, the session key 2304 has the value 0 and the command type 2305 is the "access ticket setting command."

It is determined whether or not the reply from the MFP(1) 1 is the error (step S2603), and the process is terminated in the case of the error. On the other hand, in the case where it is not the error as a result of the determination in the step S2603, the session key obtained in the step S2602 is set as the management command session key 2304, and appropriate values are set on the management command type 2305, the command parameter length 2306 and the command parameter 2307 of the management command data and they are sent to the MFP (1) 1 (step S2604). The reply from the MFP(1) 1 is processed (step S2605) to finish the process.

Moreover, when the same user issues the job management command or the device management command to the same MFP, the required access ticket has already been held by the MFP and the session key thereto has been obtained, so that the steps from the step S2601 to the step S2603 may be omitted. Thus, the job management and the device management of the MFP can be implemented with good performance.

Third Embodiment

In the above described first embodiment, the case where the print pending job issued from a client PC is printed by using an operation panel (the LCD 23 and the keyboard 24) of the MFP(1) 1 (the step S922 in FIG. 20 and the steps S1101 to S1106 in FIG. 23) was described.

In the third embodiment, an example wherein the copy job is issued according to an operating instruction from the operation panel (the LCD 23 and the keyboard 24) of the MFP(1) 1 and the copy job is executed in the MFP(1) 1 will be described.

To be more specific, it is the example wherein the job is issued from the MFP(1) 1 instead of the client PC.

Figure 40:
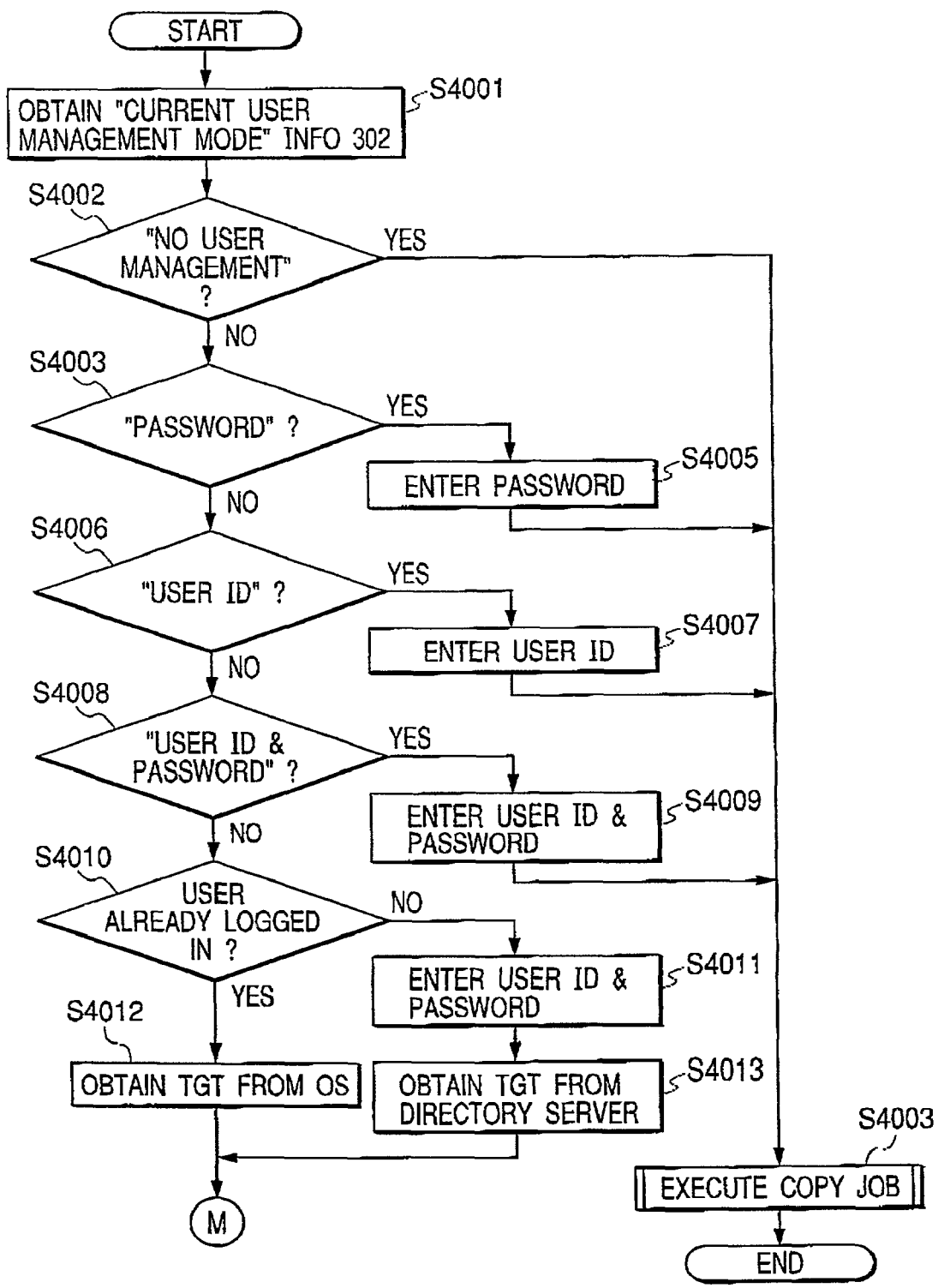
FIG. 40 and FIG. 41 are flowcharts showing the procedure of the MFP(1) in the case where a copy job is started from an operation panel of the MFP(1)
Figure 41:
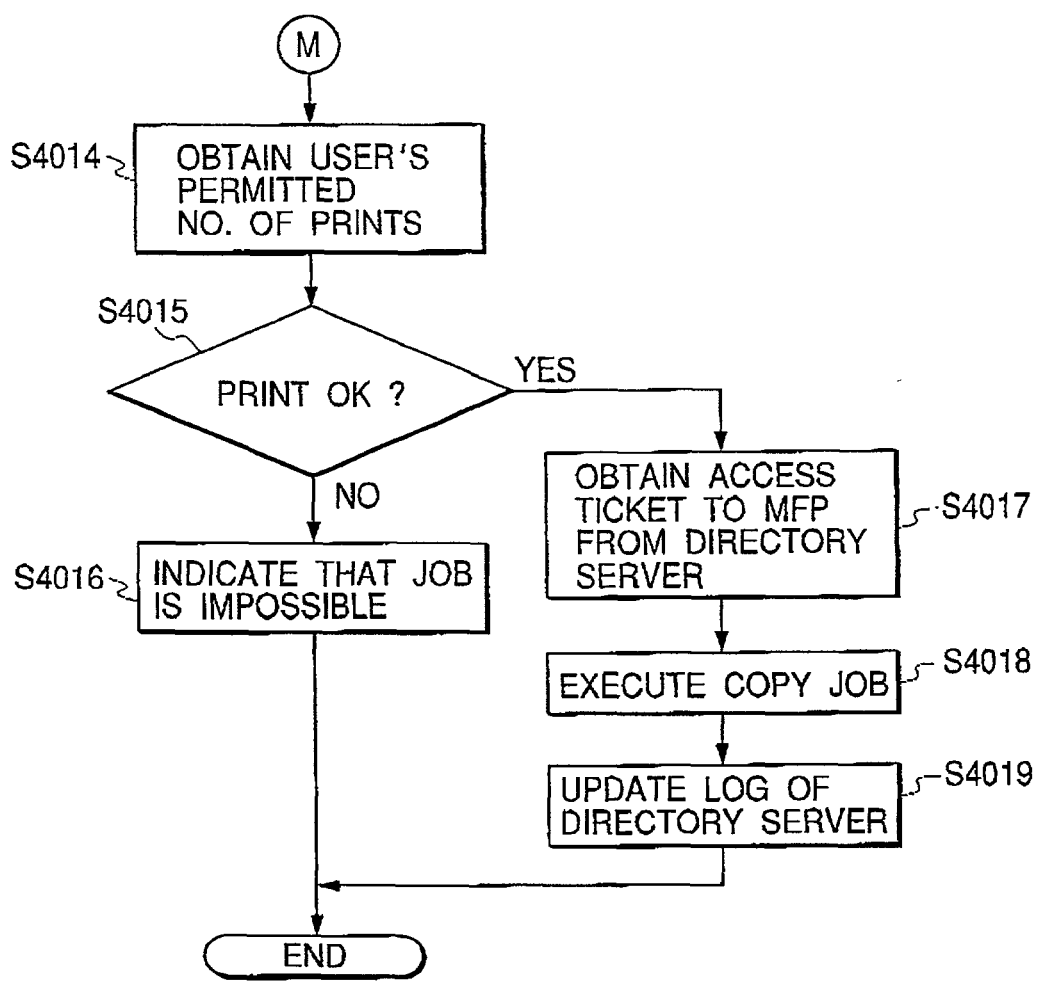

FIGS. 40 and 41 are flowcharts showing the operation of the MFP(1) at that time.

First, the "Current User Management Mode" attribute 302 that is the attribute information held by the MFP(1) 1 is obtained (step S4001). It is determined whether or not the value or the attribute information 302 is "No User Management" (step S4002), and then the scanner engine 27, the printer engine 28 and so on are controlled to execute the copy job (step S4003).

If it is determined whether or not the value of the attribute information 302 is "Password" in the step S4004, the copy job is executed (step S4003) according to the input of the normal password (step S4005) from the operation panel (the LCD 23 and the keyboard 24).

If it is determined that the value of the attribute information 302 is "User ID" in the step S4006, the copy job is executed (step S4003) according to the input of the normal user ID (step S4007) from the operation panel (the LCD 23 and the keyboard 24).

If it is determined that the value of the attribute information 302 is "User ID and Password" in the step S4008, the copy job is executed (step S4003) according to the input of the normal user ID and password (step S4009) from the operation panel (the LCD 23 and the keyboard 24).

On the other hand, in the case where it is not "User ID and Password" as a result of the determination in the step S4008, it moves on to the step S4010 determining that it is managed by the directory server 6.

In the MFP(1) 1, it is determined whether or not the user has already logged in to the security domain managed by the directory server 6 (step S4010).

In the case where the user has not logged in as a result of the determination, the user interface screen prompting for the user ID and the password is displayed on the LCD 23, and the input from the operation panel (the LCD 23 and the keyboard 24) is received (step S4011).

And the user ID and the password inputted from the operation panel (the LCD 23 and the keyboard 24) are sent to the directory server 6 by using the Kerberos protocol so as to obtain TGT (Ticket Generation Ticket) information (step S4013).

On the other hand, in the case where the user has already logged in as a result of the determination in the step S4010, the TGT used in a current session is requested and obtained (step S4012). Here in the case where the user has already logged in, the user name and so on are held in the MFP(1) 1.

The TGT obtained in the step S4012 or S4013 is used to obtain the permitted number of prints information of the user falling under the user name held by the MFP(1) 1 or the user name inputted in the step S4011 from the directory server 6 by the Kerberos protocol and the LDAP protocol (step S4014).

It is determined thereafter whether or not the permitted number of prints is one or more (step S4015), and in the case where it cannot be printed since it is less than one as a result of the determination, the user interface screen representing that the job cannot be issued is displayed on the LCD 23 (step S4016) to finish the process.

On the other hand, in the case where printing is possible with the permitted number of prints of one or more as a result of the determination in the step S4015, the TGT obtained in the step S4012 or S4013 and the parameter of the identifier identifying the MFP(1) 1 are sent to the directory server 6 by the Kerberos protocol to obtain the access ticket for the MFP(1) 1 (step S4017).

The access ticket obtained here has the information on the user name, the user ID, the user's permitted number of prints and its expiration date that is encrypted by cryptograph key attribute information 306 of the MFP(1) 1. A data format in the access ticket and encryption (algorithm) to be used are uniquely determined in advance according to the currently corresponding directory server type (attribute information 304).

And the access ticket obtained in the step S4017 and the other information required for the job are set on the job, and then the copy job is executed (step S4018).

In the step S4019, log information on the directory server 6 as to the user who executed the copy job is updated based on the results of the copy job executed in the step S4018.

To be more specific, the permitted number of prints and the number of accumulated prints corresponding to the user who executed the copy job is obtained from the directory server 6 by the LDAP protocol, and the number of copies used in the step S4018 is subtracted from the permitted number of prints and is further added to the number of accumulated prints so as to set these obtained results on the directory server 6 by the LDAP protocol.

Thus, the permitted number of prints and the number of accumulated prints managed by the directory server 6 for each user are updated.

Figure 42:
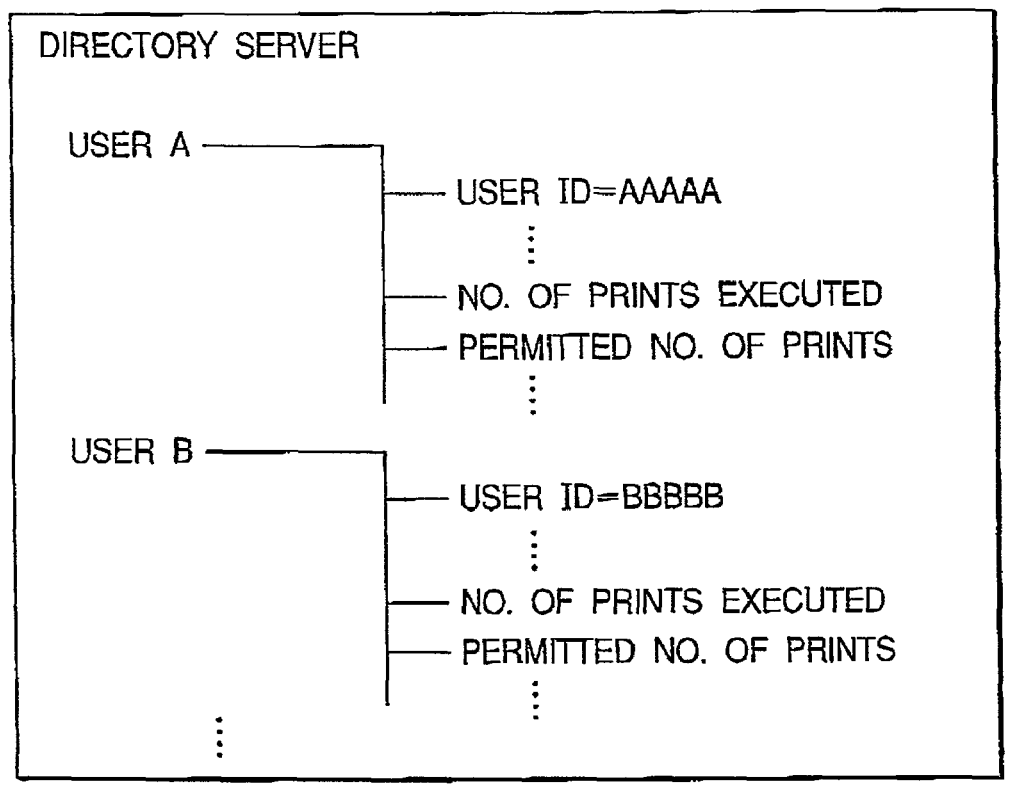
FIG. 42 is an example of the data structure of information on a user logging into each client PC registered with and managed by the directory server 6.

FIG. 42 is an example of the data structure of the information on the user logging into each client PC registered with and managed by the directory server 6.

According to this diagram, the user ID is registered first as the information on each user such as a user A and a user B, and then and the number of accumulated prints and the permitted number of prints are registered for each user.

If the user inputs the user ID and so on from the operation panel of the MFP(1) 1 and logs in to the directory server 6 to execute the copy job, the directory server 6 updates the number of accumulated prints and the permitted number of prints that are registered corresponding to the user ID based on the log information of the copy job from the MFP(1) 1.

As mentioned above, according to the third embodiment, it is possible to have the PC user use the copier by inputting from the operation panel of the copier authentication information inputted on logging in from the PC to the network, so that the use of the copier by each user can be centrally managed by the directory server.

As set forth above, according to the above embodiment, unified job management can be performed as to the access in the network environment. In addition, unified job management can be performed as to the access in the network environment. Moreover, only the user who issued the job can cancel the job.

In addition, only the user who issued the job can know the entire information on the job, and the other users can only know partial information on the job. Moreover, it is possible to perform unified job information on the access with good performance in the network environment. Furthermore, only the user who issued the job can cancel the job with good performance. Moreover, only the user who issued the job can know the entire information with good performance, and the other users can only know the partial information on the job.

In addition, it is possible to perform unified device management as to the access in the network environment. Moreover, it is possible to perform unified device management as to the access in the network environment with good performance. It is also possible to issue the job management command to the MFPs. Furthermore, it is possible to issue a job cancel command to the MFPs. It is also possible to display the jobs to the MFPs. Furthermore, it is possible to issue the device management command to the MFPs.

According to this embodiment it is possible to obtain the list of the directory server types which the MFPs can support from the outside via the network and so on. In addition, it is possible to obtain and set the directory server types which the MFPs are currently supporting from the outside via the network and so on. Furthermore, it is possible to obtain the list of the directory server types which can be supported and display it on the user interface. It is also possible to obtain the directory server which can be supported and display it on the user interface and also change the settings.

According to this embodiment, it is possible to use the unified user information on a plurality of MFPs. In addition, it is possible to centrally manage the number of accumulated prints and the maximum number of prints in the environment using a plurality of MFPs. Moreover, it is possible to limit printing for each user by the maximum number of prints in the environment using a plurality of MFPs.

In addition, it is possible to set an operation mode to be taken in the case of a failure of connecting to the directory server from the outside via the network and so on. Furthermore, the MFPs can be used in the case of a failure of connecting to the directory server. Moreover, the MFPs can be used within a fixed time of the final normal login in the case of a failure of connecting to the directory server. In addition, the MFPs can be used to the extent not exceeding the maximum number of prints stored in the device within the fixed time of the final normal login in the case of a failure of connecting to the directory server. Moreover, the MFPs can be used up the maximum number of prints at the time of the final normal login within the fixed time of the final normal login in the case of a failure of connecting to the directory server. In addition, the MFPs can be used to the extent not exceeding the maximum number of prints stored in the device in the case of a failure of connecting to the directory server.

In addition, the MFPs can be used up the maximum number of prints at the time of the final normal login in the case of a failure of connecting to the directory server. Moreover, the MFPs can be used to the extent not exceeding the maximum number of prints for each login in the case of a failure of connecting to the directory server. In addition, it is possible to prohibit the user from using the MFPs in order to perform correct user management in the case of a failure of connecting to the directory server. Furthermore, the MFPs can be used up the maximum number of prints to which the expected number of prints after normally connecting to the directory server is added. In addition, it is possible to issue the jobs to the MFPs.

Moreover, while the embodiments of the present invention were described above, the present invention is not limited to the configurations of these embodiments, but it is applicable to any configuration capable of accomplishing the functions according to the claims or the functions that the configurations of the embodiments have.

In addition, it is needless to say that the present invention is applicable to the cases where it can be accomplished by supplying the program to the system or the equipment by means of a record medium storing a program code of software for implementing the functions of the aforementioned embodiments. In this case, the program code read from the storage medium itself implements a new function of the present invention, so that the storage medium storing the program constitutes the present invention.

In the above embodiments, the program code shown in each flowchart is stored in the storage medium. As for the storage medium for supplying the program code, for instance, a ROM, a floppy disk, a hard disk, an optical disk, a magneto-optical disk, a CD-ROM, a CD-R, a DVD, a magnetic tape, a nonvolatile memory card and so on can be used.

According to the present invention, unified access control can be performed as to the job management in the network environment. In addition, the unified access control can be performed as to the job management in the network environment so that the performance will not deteriorate.

In addition, it can provide a general purpose peripheral equipment control system wherein the peripheral equipment control software does not require the subject MFP to wait for the information on the corresponding directory server type.

Moreover, the unified management of the user information is performed so that the same user information can be used by a plurality of devices in the environment for using a plurality of devices connected to the network and so on. In addition, it is possible to perform central management of the accumulated number of prints and the maximum number of prints of the user in the environment for using a plurality of devices connected to the network and so on. Furthermore, it is possible to temporarily use the MFPs in the case of a network failure.

What is claimed is:

1. A method of controlling peripheral equipment connected to a network and managed by a directory server on the network, comprising:
    a first receiving step of receiving a print job issued from an information processing apparatus on the network together with a first access ticket issued from the directory server, with the directory server being separate from the information processing apparatus;
    a storing step of storing the print job received in said first receiving step to a storing medium;
    a first decrypting step of decrypting the first access ticket received together with the print job in said first receiving step;
    a first control step of determining validity of the first access ticket received in said first receiving step based on the decrypting result of said first decrypting step and limiting execution of the print job received in said first receiving step;
    a second receiving step of receiving a management command from an information processing apparatus on the network together with a second access ticket issued from the directory server, at timing independent of said first receiving step, with the directory server being separate from the information processing apparatus;
    a second decrypting step of decrypting the second access ticket received together with the management command in said second receiving step; and
    a second control step of determining validity of the second access ticket received in said second receiving step based on the decrypting result of said second decrypting step and limiting execution of the management command,
    wherein in the case where the management command received in said second receiving step is one for deleting a specified print job stored in the storing medium, said second control step (a) obtains the decryption results of said first decrypting step for the first access ticket received together with the specified print job, (b) compares user information in the decryption results of said second decrypting step for the second access ticket received together with the management command for deleting the specified print job with user information in the obtained decryption results for the first access ticket, (c) limits execution of deleting the specified print job in the storing medium if the comparison indicates that the user information in the decryption results for the second access ticket does not correspond to the user information in the decryption results for the first access ticket, and (d) enables execution of deleting the specified print job in the storing medium if the comparison indicates that the user information in the decryption results for the second ticket corresponds to the user information in the decryption results for the first access ticket.

2. The method according to claim 1, wherein the decrypting result of said first decrypting step includes information about permitted number of prints.

3. The method according to claim 1, wherein in the case where the management command received in said second receiving step is one for displaying a list of jobs, said second control step changes a display form of the job list based on the decryption results of said second decrypting step.

4. The method according to claim 1, wherein execution of deleting the specified print job in the storing medium is enabled only if the comparison indicates that the user information in the decryption results for the second ticket corresponds to the user information in the decryption results for the first access ticket.

5. Peripheral equipment connected to a network and managed by a directory server on the network, comprising:
a first receiving unit for receiving a print job issued from an information processing apparatus on the network together with a first access ticket issued from the directory server, with the directory server being separate from the information processing apparatus;
a storing unit for storing the print job received by said first receiving unit;
a first decrypting unit for decrypting the first access ticket received together with the print job by said first receiving unit;
a first control unit for determining validity of the first access ticket received by said first receiving unit based on the decrypting result of said first decrypting unit and limiting execution of the print job received by said first receiving unit;
a second receiving unit for receiving a management command from an information processing apparatus on the network together with a second access ticket issued from the directory server, at timing independent of said first receiving unit, with the directory server being separate from the information processing apparatus;
a second decrypting unit for decrypting the second access ticket received together with the management command by said second receiving unit; and
a second control unit for determining validity of the second access ticket received by said second receiving unit based on the decrypting result of said second decrypting unit and limiting execution of the management command,
wherein in the case where the management command received by said second receiving unit is one for deleting a specified print job stored in said storing unit, said second control unit (a) obtains the decryption results of said first decrypting unit for the first access ticket received together with the specified print job, (b) compares user information in the decryption results of said second decrypting unit for the second access ticket together with the management command for deleting the specified print job with user information in the first access ticket, (c) limits execution of deleting the specified print job in said storing unit if the comparison indicates that the user information in the decryption results for the second access ticket does not correspond to the user information in the decryption results for the first ticket, and (d) enables execution of deleting the specified print job in the storing medium if the comparison indicates that the user information in the decryption results for the second access ticket corresponds to the user information in the decryption results for the first access ticket.

6. The peripheral equipment according to claim 5, wherein the decrypting result of said first decrypting unit includes information about permitted number of prints.

7. The peripheral equipment according to claim 5, wherein in the case where the management command received in said second receiving unit is one for displaying a list of jobs, said second control step changes a display form of the job list based on the decryption results of said second decrypting unit.

8. A non-transitory computer-readable medium storing a computer program executed on a computer of peripheral equipment connected to a network and managed by a directory server on the network, the program causing the computer to execute a method comprising:
a first receiving step of receiving a print job issued from an information processing apparatus on the network together with a first access ticket issued from the directory server, with the director server being separate from the information processing apparatus;
a storing step of storing the print job received in said first receiving step to a storing medium;
a first decrypting step of decrypting the first access ticket received together with the print job in said first receiving step;
a first control step of determining validity of the first access ticket received in said first receiving step based on the decrypting result of said first decrypting step and limiting execution of the print job received in said first receiving step;
a second receiving step of receiving a management command from an information processing apparatus on the network together with a second access ticket issued from the directory server, at timing independent of said first receiving step, with the directory server being separate from the information processing apparatus;
a second decrypting step of decrypting the second access ticket received together with the management command in said second receiving step; and
a second control step of determining validity of the second access ticket received in said second receiving step based on the decryption result of said second decrypting step and limiting execution of the management command,
wherein in the case where the management command received in said second receiving step is one for deleting a specified print job stored in the storing medium, said second control step (a) obtains the decryption results of said first decrypting step for the first access ticket received together with the specified print job, (b) compares user information in the decryption results of said second decrypting step for the second ticket received together with the management command for deleting the specified print job with user information in the obtained decryption results for the first ticket, (c) limits execution of deleting the specified print job in the storing medium if the comparison indicates that the user information in the decryption results for the second access ticket does not correspond to the user information in the decryption results for the first access ticket, and (d) enables execution of deleting the specified print job in the storing medium if the comparison indicates that the user information in the decryption results for the second access ticket corresponds to the user information in the decryption results for the first access ticket.

9. A method of controlling peripheral equipment connected to a network and managed by a directory server on the network, comprising:
   a first receiving step of receiving a print job issued from an information processing apparatus on the network together with an access ticket issued from the directory server, with the directory server being separate from the information processing apparatus;
   a storing step of storing the print job received in said first receiving step to a storing medium;
   a first decrypting step of decrypting the access ticket received together with the print job in said first receiving step;
   a first control step of determining validity of the access ticket received in said first receiving step based on the decrypting result of said first decrypting step and limiting execution of the print job received in said first receiving step;
   an obtaining step of obtaining from the directory server, access information corresponding to a specified user;
   an inputting step of inputting a management command from an operation panel of the peripheral equipment; and
   a second control step of determining validity of the access information obtained in said obtaining step and limiting execution of the management command,
   wherein in the case where the management command inputted in said inputting step is one for deleting a specified print job stored in the storing medium, said second control step (a) obtains the decryption results of said first decrypting step for the first access ticket received together with the specified print job, (b) compares user information in the access information with user information in the obtained decryption results for the first access ticket, (c) limits execution of deleting the specified print job in the storing medium if the comparison indicates that the user information in the access information does not correspond to the user information in the decryption results for the first access ticket, and (d) enables execution of deleting the specified print job in the storing medium if the comparison indicates that the user information in the access information corresponds to the user information in the decryption results for the first access ticket.

10. The method according to claim 9, wherein execution of deleting the specified print job in the storing medium is enabled only if the comparison indicates that the user information in the decryption results for the second ticket corresponds to the user information in the decryption results for the first access ticket.

11. Peripheral equipment connected to a network and managed by a directory server on the network, comprising:
   a first receiving unit for receiving a print job issued from an information processing apparatus on the network together with an access ticket issued from the directory server, with the directory server being separate from the information processing apparatus;
   a storing unit for storing the print job received by said first receiving unit;
   a first decrypting unit adapted for decrypting the access ticket received together with the print job by said first receiving unit;
   a first control unit for determining validity of the access ticket received by said first receiving unit based on the decrypting result of said first decrypting unit and limiting execution of the print job received by said first receiving unit;
   an obtaining unit for obtaining from said directory server, access information corresponding to a specified user;
   an operating panel for inputting a management command; and
   a second control unit for determining validity of the access information obtained in said obtaining unit and limiting execution of the management command,
   wherein in the case where the management command inputted by said operating panel is one for deleting a specified print job stored in said storing unit, said second control unit (a) obtains the decryption results of said first decrypting unit for the first access ticket received together with the specified print job, (b) compares user information in the access information with user information in the obtained decryption results for the first access ticket, (c) limits execution of deleting the specified print job in said storing unit if the comparison indicates that the user information in the access information does not correspond to the user information in the decryption results for the first access ticket, and (d) enables execution of deleting the specified print job in the storing medium if the comparison indicates that the user information in the access information corresponds to the user information in the decryption results for the first access ticket.

12. A non-transitory computer-readable medium storing a computer program executed on a computer of peripheral equipment connected to a network and managed by a directory server on the network, the program causing the computer to execute a method comprising:
   a first receiving step of receiving a print job issued from an information processing apparatus on the network together with an access ticket issued from the directory server, with the directory server being separate from the information processing apparatus;
   a storing step of storing the print job received in said first receiving step to a storing medium;
   a first decrypting step of decrypting the access ticket received together with the print job in said first receiving step;
   a first control step of determining validity of the access ticket received in said first receiving step based on the decrypting result of said first decrypting step and limiting execution of the print job received in said first receiving step;
   an obtaining step of obtaining from the directory server, access information corresponding to a specified user;
   an inputting step of inputting a management command from an operation panel of the peripheral equipment; and
   a second control step of determining validity of the access information obtained in said obtaining step and limiting execution of the management command,
   wherein in the case where the management command inputted in said inputting step is one for deleting a specified print job stored in the storing medium, said second control step (a) obtains the decryption results of said first decrypting step for the first access ticket received together with the specified print job, (b) compares user information in the access information with user information in the obtained decryption results for the first access ticket, (c) limits execution of deleting the specified print job in the storing medium if the comparison indicates that the user information in the access information does not correspond to the user information in the decryption results for the first access ticket, and (d) enables execution of deleting the specified print job in the storing medium if the comparison indicates that the user information in the access information corresponds to the user information in the decryption results for the first access ticket.

* * * * *